United States Patent
Tazbaz

(10) Patent No.: US 10,975,603 B2
(45) Date of Patent: Apr. 13, 2021

(54) FLEXIBLE DISPLAY COMPUTING DEVICE

(71) Applicant: Microsoft Corporation, Redmond, WA (US)

(72) Inventor: Errol M. Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 14/303,510

(22) Filed: Jun. 12, 2014

(65) Prior Publication Data

US 2015/0361696 A1    Dec. 17, 2015

(51) Int. Cl.
| | |
|---|---|
| *G06F 1/16* | (2006.01) |
| *E05D 3/06* | (2006.01) |
| *E05D 7/00* | (2006.01) |
| *H04M 1/02* | (2006.01) |

(52) U.S. Cl.
CPC .............. *E05D 7/00* (2013.01); *E05D 3/06* (2013.01); *G06F 1/1616* (2013.01); *G06F 1/1652* (2013.01); *G06F 1/1681* (2013.01); *H04M 1/022* (2013.01); *H04M 1/0268* (2013.01); *G06F 2203/04102* (2013.01)

(58) Field of Classification Search
CPC .... G06F 1/1616; G06F 1/1681; G06F 1/1652; E05D 7/00; E05D 3/06
USPC ............. 361/679.01, 749, 679.04; 455/575.3
See application file for complete search history.

(56) References Cited

U.S. PATENT DOCUMENTS

| | | | |
|---|---|---|---|
| 2,135,280 A | 11/1938 | Erickson | |
| 2,200,142 A | 5/1940 | Witschi | |
| 2,206,739 A | 7/1940 | Brogren et al. | |
| 3,422,487 A | 1/1969 | Brancati et al. | |
| 3,483,588 A | 12/1969 | Hover | |
| 4,599,998 A | 7/1986 | Castillo | |
| 4,610,560 A | 9/1986 | Miller | |
| 4,825,395 A | 4/1989 | Kinser, Jr. et al. | |
| 5,363,089 A | 11/1994 | Goldenberg | |
| 5,570,971 A | 11/1996 | Rixen et al. | |
| 5,987,704 A | 11/1999 | Tang | |
| 6,223,393 B1 | 5/2001 | Knopf | |

(Continued)

FOREIGN PATENT DOCUMENTS

| | | |
|---|---|---|
| CN | 1809795 A | 7/2006 |
| CN | 101107451 A | 1/2008 |

(Continued)

OTHER PUBLICATIONS

International Search Report & Written Opinion dated Aug. 25, 2015 from PCT Patent Application No. PCT/US2015/034614, 14 pages.

(Continued)

*Primary Examiner* — Rockshana D Chowdhury

(74) *Attorney, Agent, or Firm* — Rainier Patents, P.S.

(57) ABSTRACT

The description relates to devices, such as computing devices that have hinged portions. One example can include a first portion and a second portion and a flexible display secured to the first and second portions. This example can also include a hinge assembly rotatably securing the first and second portions. The hinge assembly can be fixedly secured to the second portion and movably secured to the first portion such that a length of the hinge assembly can change when the first portion and second portion are rotated relative to one another.

20 Claims, 19 Drawing Sheets

(56) References Cited

U.S. PATENT DOCUMENTS

| | | | |
|---|---|---|---|
| 6,754,081 | B2 | 6/2004 | Rude et al. |
| 6,895,638 | B2 | 5/2005 | Lin |
| 7,042,711 | B2 | 5/2006 | Tanaka et al. |
| 7,197,790 | B1 | 4/2007 | Edmondson |
| 7,345,872 | B2 | 3/2008 | Wang |
| 7,533,446 | B1* | 5/2009 | Lin ................... G06F 1/1616 16/303 |
| 7,714,801 | B2 | 5/2010 | Kimmel |
| 7,730,587 | B2 | 6/2010 | Chang et al. |
| 7,765,644 | B2 | 8/2010 | Ueyama et al. |
| 8,229,522 | B2 | 7/2012 | Kim et al. |
| 8,438,702 | B2 | 5/2013 | Apgar et al. |
| 8,477,464 | B2 | 7/2013 | Visser et al. |
| 8,562,236 | B2 | 10/2013 | Eikelenboom |
| 8,578,561 | B2 | 11/2013 | Chuang |
| 8,627,546 | B2 | 1/2014 | Zhang et al. |
| 8,720,011 | B1 | 5/2014 | Hsu et al. |
| 8,869,353 | B2 | 10/2014 | Hsu et al. |
| 9,235,239 | B2* | 1/2016 | van Dijk ................ G09F 9/301 |
| 2003/0112588 | A1 | 6/2003 | Shimano |
| 2004/0134034 | A1 | 7/2004 | Baer |
| 2005/0155182 | A1 | 7/2005 | Han et al. |
| 2006/0236505 | A1 | 10/2006 | Maatta et al. |
| 2006/0238968 | A1 | 10/2006 | Maatta et al. |
| 2007/0226955 | A1 | 10/2007 | Cho et al. |
| 2007/0234521 | A1 | 10/2007 | Komppa |
| 2008/0109995 | A1 | 5/2008 | Kuwajima |
| 2008/0216288 | A1 | 9/2008 | Hoffman |
| 2008/0284295 | A1 | 11/2008 | Lai et al. |
| 2009/0000062 | A1 | 1/2009 | Yamanami |
| 2009/0013500 | A1 | 1/2009 | Ueyama et al. |
| 2009/0070961 | A1 | 3/2009 | Chung et al. |
| 2009/0241290 | A1 | 10/2009 | Jones et al. |
| 2010/0024169 | A1 | 2/2010 | Self |
| 2010/0232100 | A1* | 9/2010 | Fukuma ............. H04M 1/0216 361/679.01 |
| 2010/0277860 | A1* | 11/2010 | Jeong ................ H04M 1/0216 361/679.27 |
| 2011/0000136 | A1 | 1/2011 | Brun |
| 2011/0063783 | A1* | 3/2011 | Shim .................... G06F 1/1681 361/679.01 |
| 2011/0097138 | A1 | 4/2011 | Eikelenboom |
| 2011/0157780 | A1 | 6/2011 | Wang et al. |
| 2011/0265288 | A1 | 11/2011 | Chiang |
| 2011/0271486 | A1 | 11/2011 | Wang et al. |
| 2011/0289726 | A1 | 12/2011 | Zhang et al. |
| 2012/0002360 | A1 | 1/2012 | Seo et al. |
| 2012/0044620 | A1* | 2/2012 | Song ................... G06F 1/1681 361/679.01 |
| 2012/0047685 | A1 | 3/2012 | Ma et al. |
| 2012/0120618 | A1 | 5/2012 | Bohn |
| 2012/0162049 | A1 | 6/2012 | Aoki et al. |
| 2012/0307423 | A1* | 12/2012 | Bohn .................. G06F 1/1652 361/679.01 |
| 2012/0314399 | A1 | 12/2012 | Bohn et al. |
| 2013/0010405 | A1 | 1/2013 | Rothkopf et al. |
| 2013/0014346 | A1 | 1/2013 | Ahn et al. |
| 2013/0016489 | A1 | 1/2013 | Yeh et al. |
| 2013/0021762 | A1* | 1/2013 | van Dijk .............. H05K 5/0226 361/749 |
| 2013/0083466 | A1 | 4/2013 | Becze et al. |
| 2013/0135809 | A1 | 5/2013 | Uchiyama et al. |
| 2013/0139355 | A1 | 6/2013 | Lee et al. |
| 2013/0187525 | A1 | 7/2013 | Chuang |
| 2013/0216740 | A1 | 8/2013 | Russell-Clark et al. |
| 2013/0219663 | A1 | 8/2013 | Cai |
| 2014/0174226 | A1 | 6/2014 | Szi et al. |
| 2014/0174227 | A1 | 6/2014 | Hsu et al. |
| 2014/0196253 | A1 | 7/2014 | Song et al. |
| 2014/0196254 | A1 | 7/2014 | Song |
| 2014/0217875 | A1 | 8/2014 | Park et al. |
| 2014/0245569 | A1 | 9/2014 | Cho et al. |
| 2015/0176317 | A1 | 6/2015 | Lee |
| 2015/0362956 | A1 | 12/2015 | Tazbaz |

FOREIGN PATENT DOCUMENTS

| | | |
|---|---|---|
| CN | 102640073 A | 8/2012 |
| CN | 203176150 U | 9/2013 |
| EP | 2546721 A2 | 1/2013 |
| GB | 2080407 A | 3/1982 |
| JP | H0581792 U | 11/1993 |
| JP | 2010218102 A | 9/2010 |
| JP | 2011033087 A | 2/2011 |
| RU | 2380850 C2 | 1/2010 |
| TW | 453755 U | 5/2013 |
| WO | 2014030912 A1 | 2/2014 |

OTHER PUBLICATIONS

Khalilbeigi, et al., "FoldMe: Interacting with Double-sided Foldable Displays", In Proceedings of 6th International Conference on Tangible, Embedded and Embodied Interaction, Feb. 19, 8 pages.

Second Written Opinion dated Feb. 17, 2016 from PCT Patent Application No. PCT/US2015/034611, 9 pages.

Response filed Jan. 29, 2016 to the Non-Final Office Action dated Oct. 9, 2015 from U.S. Appl. No. 14/303,537, 15 pages.

Final Office Action dated Mar. 4, 2016 from U.S. Appl. No. 14/303,537, 24 pages.

Demand and Response filed Dec. 7, 2015 to the International Search Report and Written Opinion dated Aug. 25, 2015 from PCT Patent Application No. PCT/US2015/034614, 18 pages.

Non-Final Office Action dated Oct. 9, 2015 from U.S. Appl. No. 14/303,537, 16 pages.

Demand and Response filed Oct. 26, 2015 to the Written Opinion dated Aug. 24, 2015 from PCT Patent Application No. PCT/US2015/034611, 15 pages.

International Search Report and Written Opinion dated Aug. 28, 2015 from PCT Patent Application No. PCT/US2015/034611, 12 pages.

Response filed Jun. 15, 2016 to the Final Office Action dated Mar. 4, 2016 from U.S. Appl. No. 14/303,537, 13 pages.

Second International Search Report & Written Opinion dated May 18, 2016 from PCT Patent Application No. PCT/US2015/034614, 8 pages.

International Preliminary Report on Patenability dated May 11, 2015 from PCT Patent Application No. PCT/US2015/034611, 10 pages.

Applicant-Initiated Interview Summary dated Oct. 11, 2016 from U.S. Appl. No. 14/303,537, 3 pages.

Final Office Action dated Nov. 4, 2016 from U.S. Appl. No. 14/303,537, 18 pages.

International Preliminary Report on Patentability dated Sep. 16, 2016 from PCT Application No. PCT/US2015/034614, 9 pages.

After Final Consideration Pilot Program Request and Response filed Dec. 22, 2016 to the Final Office Action dated Nov. 4, 2016 from U.S. Appl. No. 14/303,537, 12 pages.

Response filed Oct. 5, 2016 to the Non-Final Office Action dated Jun. 30, 2016 from U.S. Appl. No. 14/303,537, 10 pages.

Non-Final Office Action dated Jun. 30, 2016 from U.S. Appl. No. 14/303,537, 10 pages.

Response filed Jul. 20, 2016 to the Second International Search Report & Written Opinion dated May 18, 2016 from PCT Patent Application No. PCT/US2015/034614, 9 pages.

Communication pursuant to Rules 161(1) and 162 EPC dated Jan. 19, 2017 from European Patent Application No. 15730930.3, 2 pages.

Corrected Notice of Allowability dated Mar. 17, 2017 from U.S. Appl. No. 14/303,537, 14 pages.

Corrected Notice of Allowability dated Apr. 10, 2017 from U.S. Appl. No. 14/303,537, 6 pages.

Corrected Notice of Allowability dated May 8, 2017 from U.S. Appl. No. 14/303,537, 2 pages.

Response filed Mar. 16, 2017 to the Communication pursuant to Rules 161(1) and 162 EPC dated Feb. 10, 2017 from European Patent Application No. 15732112.6, 12 pages.

(56) References Cited

OTHER PUBLICATIONS

Response filed Jun. 14, 2017 to the Communication pursuant to Rules 161(1) and 162 EPC dated Jan. 19, 2017 from European Patent Application No. 15730930.3, 9 pages.
Advisory Action, Examiner-Initiated Interview Summary and After Final Consideration Program Decision dated Jan. 31, 2017 from U.S. Appl. No. 14/303,537, 5 pages.
Response filed Feb. 2, 2017 to the Final Office Action dated Nov. 4, 2016 from U.S. Appl. No. 14/303,537, 11 pages.
Notice of Allowance and Examiner-Initiated Interview Summary dated Feb. 23, 2017 from U.S. Appl. No. 14/303,537, 22 pages.
Communication pursuant to Rules 161(1) and 162 EPC dated Feb. 10, 2017 from European Patent Application No. 15732112.6, 2 pages.
"Written Opinion Issued in Singapore Patent Application No. 11201609818P", dated Oct. 19, 2017, 6 Pages.
"Office Action Issued in Chile Patent Application No. 3161-2016", dated Mar. 20, 2018, 6 Pages.
"Office Action Issued in European Patent Application No. 15730930.3" dated Dec. 19, 2017, 10 Pages.
"First Office Action and Search Report Issued in Chinese Patent Application No. 201580031122.X", dated Jul. 25, 2018, 13 Pages.
"Office Action Issued in Colombian Patent Application No. NC2016/0005606", dated Mar. 14, 2018, 8 Pages.
"First Office Action and Search Report Issued in Chinese Patent Application No. 201580031306.6", dated Dec. 21, 2018, 16 Pages.
"Office Action Issued in European Patent Application No. 15730930.3", dated Jun. 28, 2018, 7 Pages.
"Office Action Issued in Russian Patent Application No. 2016147355", dated Jan. 31, 2019, 12 Pages.
"Second Office Action Issued in Chinese Patent Application No. 201580031122.X", dated Jan. 31, 2019, 9 Pages.
"Third Office Action Issued in Chinese Patent Application No. 201580031122.X", dated Jun. 27, 2019, 6 Pages.
"Office Action Issued in Chinese Patent Application No. 201580031306.6", dated Jun. 5, 2019, 17 Pages.
"Office Action Issued in Japanese Patent Application No. 2016-569900", dated May 7, 2019, 8 Pages.
"Office Action Issued in Indonesian Patent Application No. P00201608433", dated Jul. 19, 2019, 3 Pages.
"Fourth Office Action Issued in Chinese Patent Application No. 201580031122.X", dated Oct. 11, 2019, 7 Pages.
"Office Action Issued in Australian Patent Application No. 2015275033", dated Dec. 5, 2019, 3 Pages.
"Office Action Issued in Japanese Patent Application No. 2016-569900", dated Dec. 3, 2019, 6 Pages.
"Office Action Issued in Japanese Patent Application No. 2016-569900", dated Jul. 7, 2020, 10 Pages.
"Office Action Issued in Brazilian Patent Application No. BR112016027013-4", dated May 11, 2020, 5 Pages.
"Office Action Issued in Indian Patent Application No. 201647042326", dated Oct. 21, 2020, 6 Pages.

\* cited by examiner

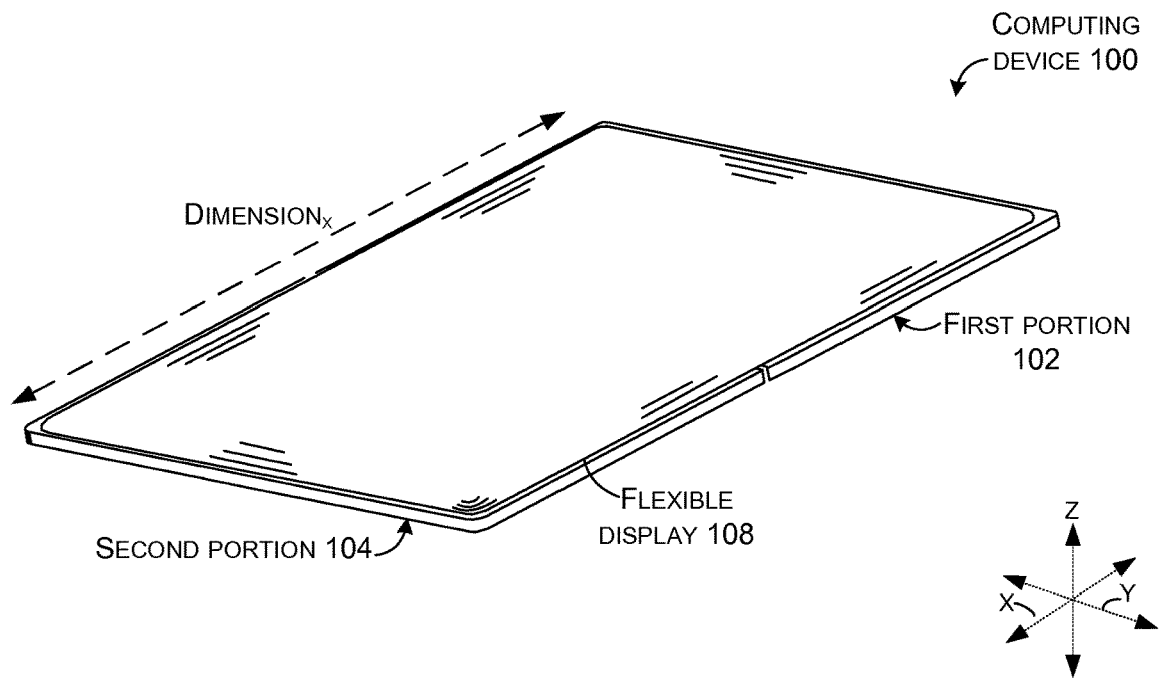
INSTANCE ONE – DEPLOYED CONFIGURATION
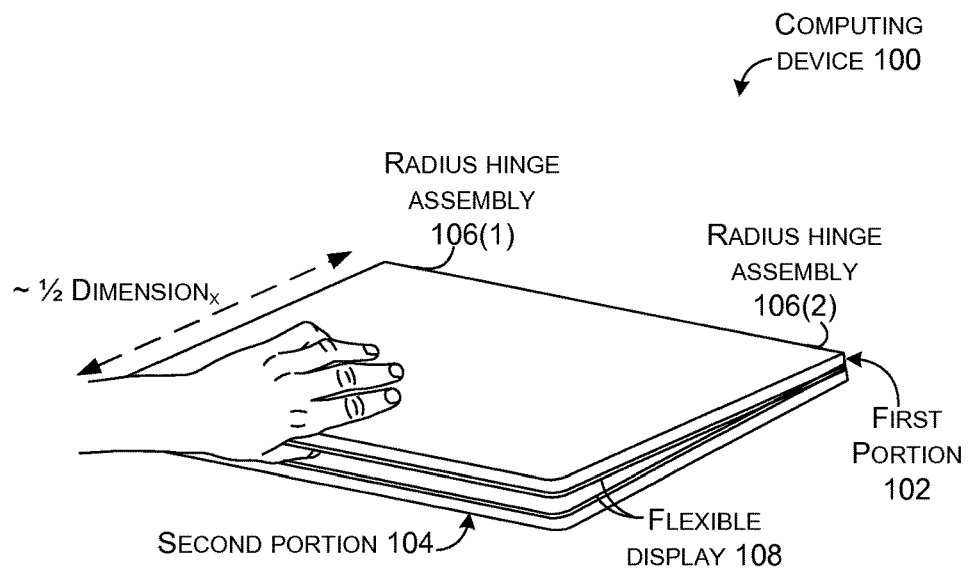
INSTANCE TWO - STORAGE CONFIGURATION
FIG. 1

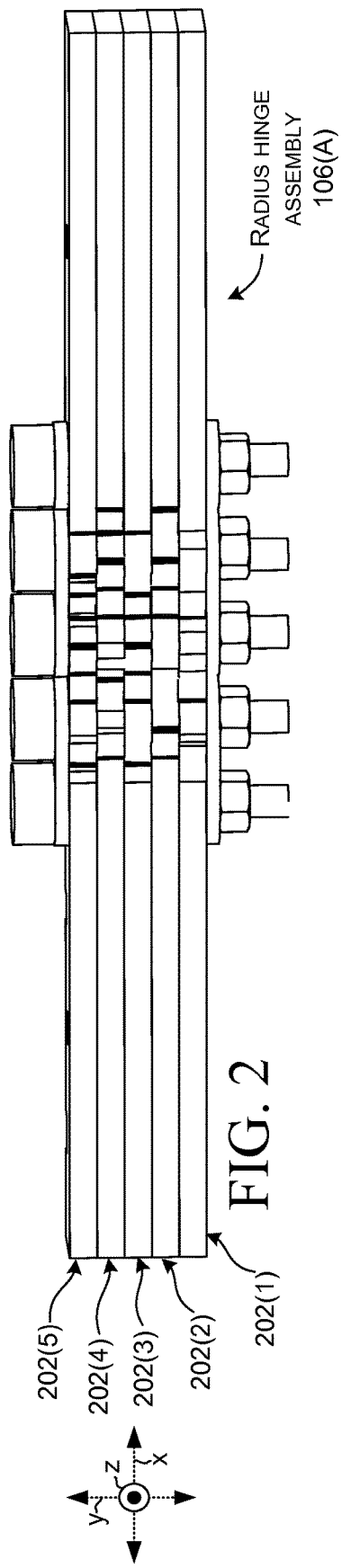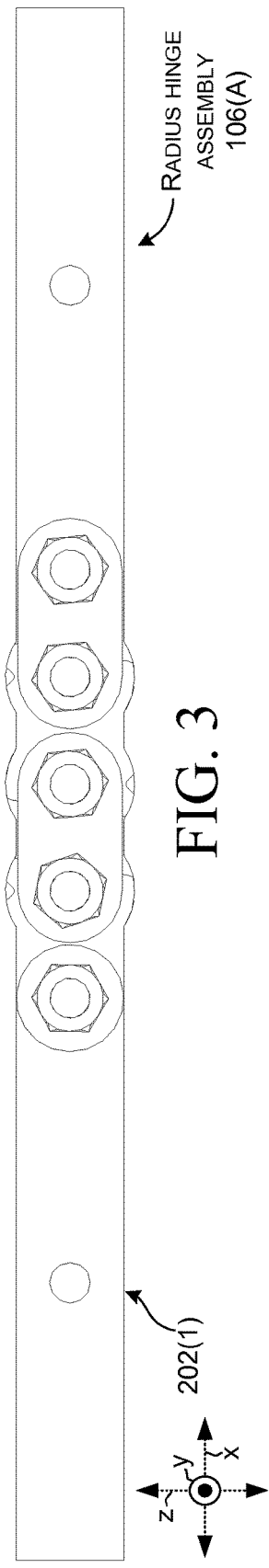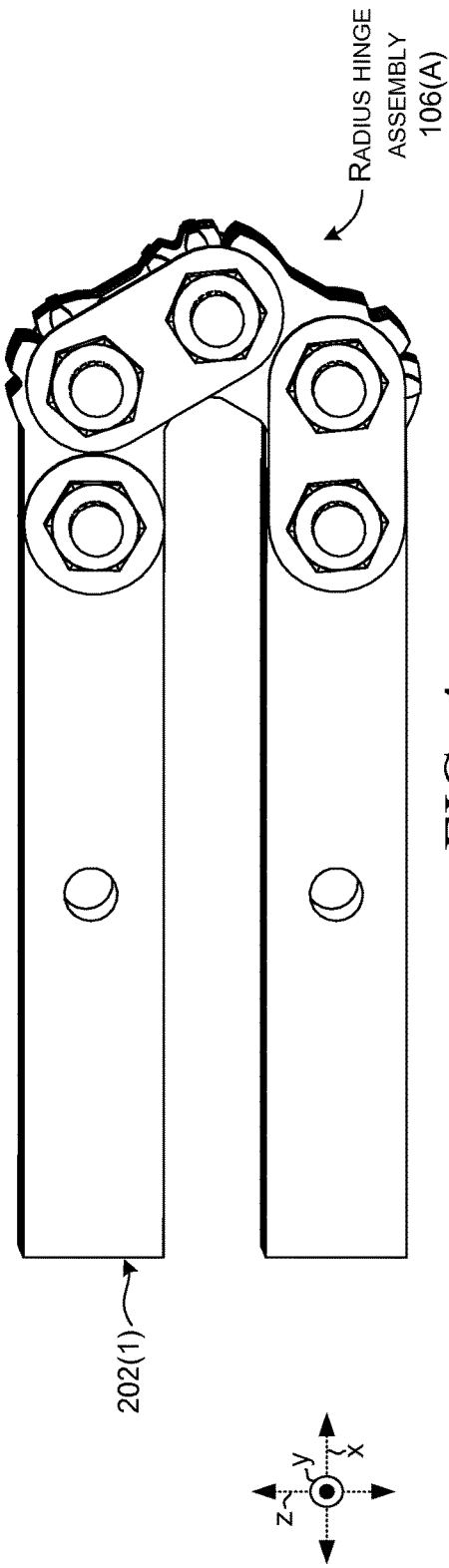

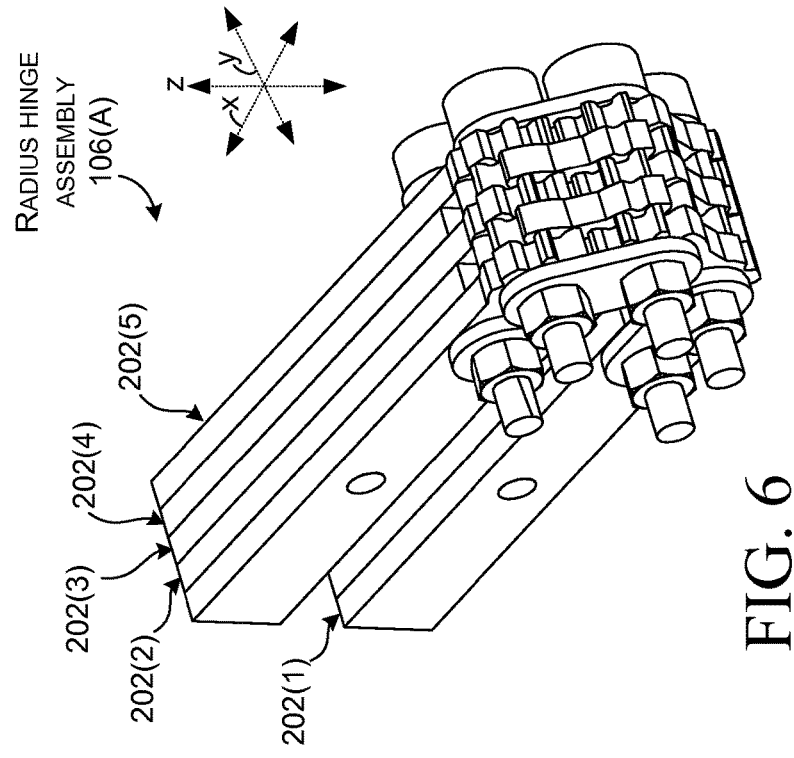
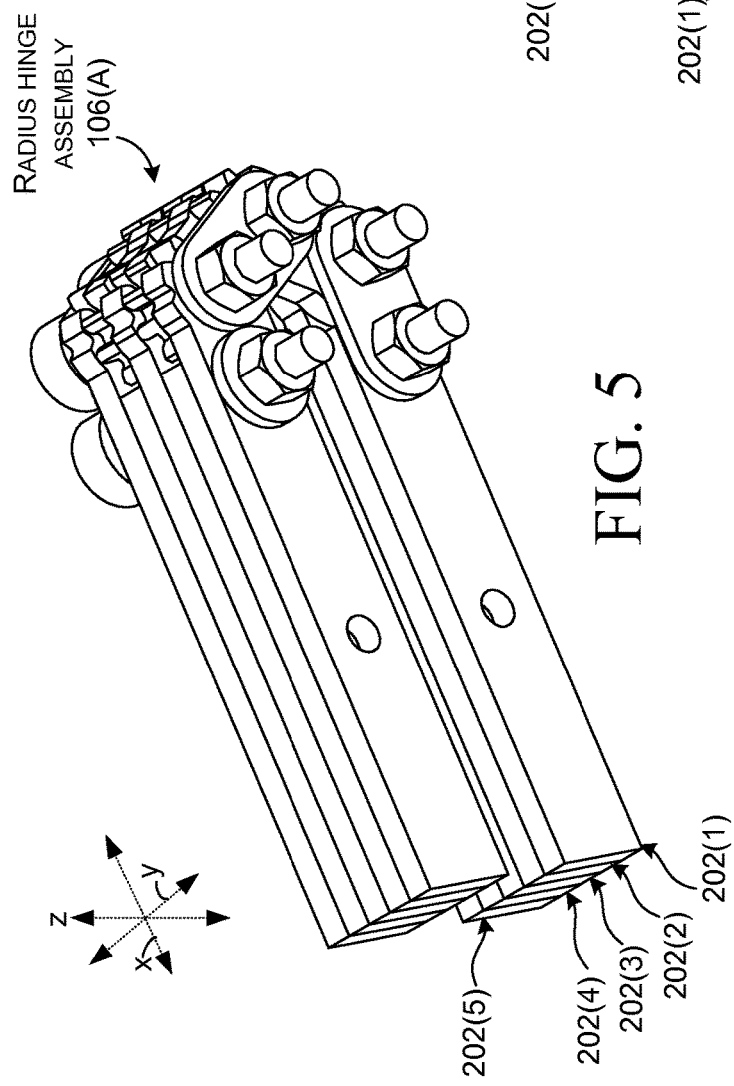

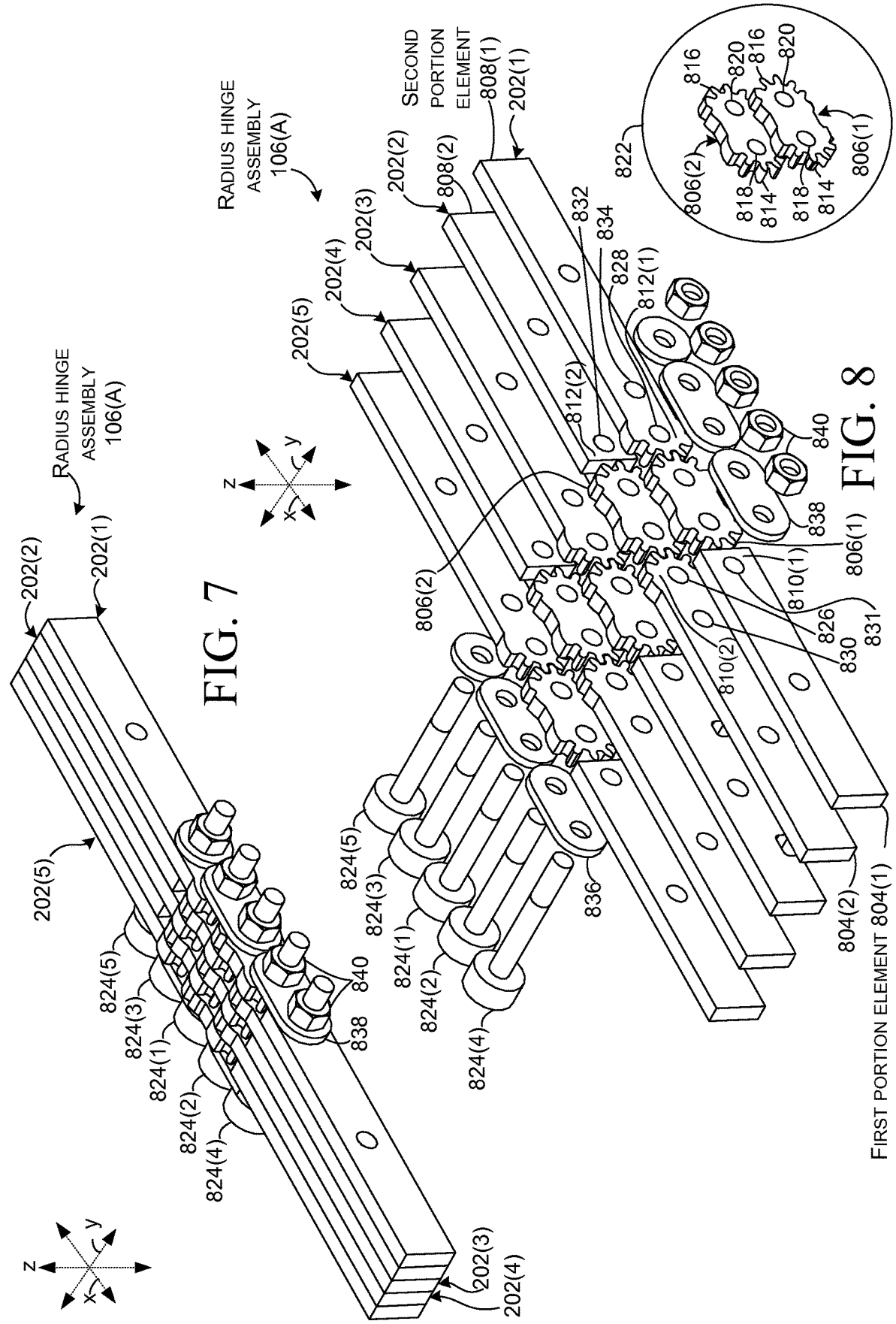

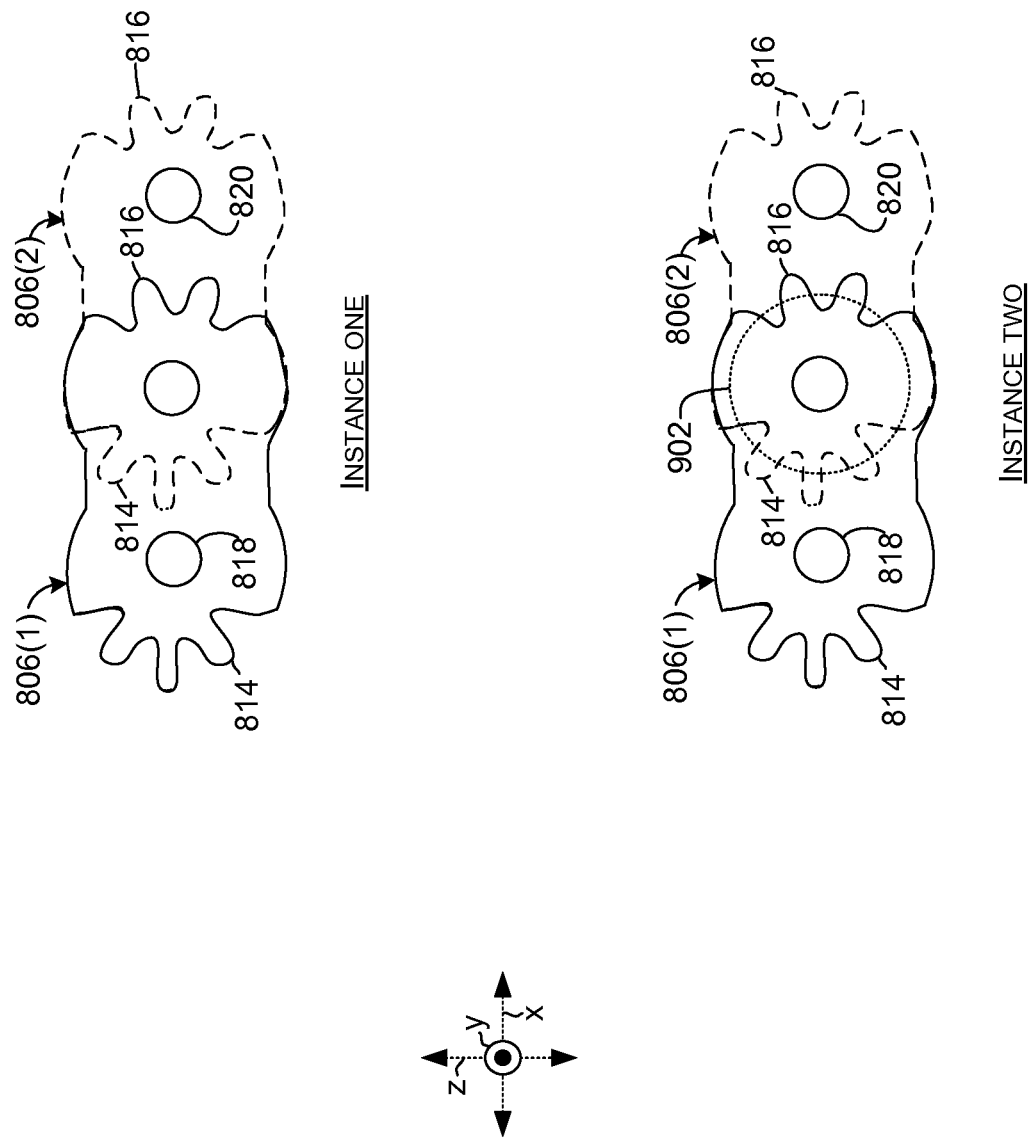

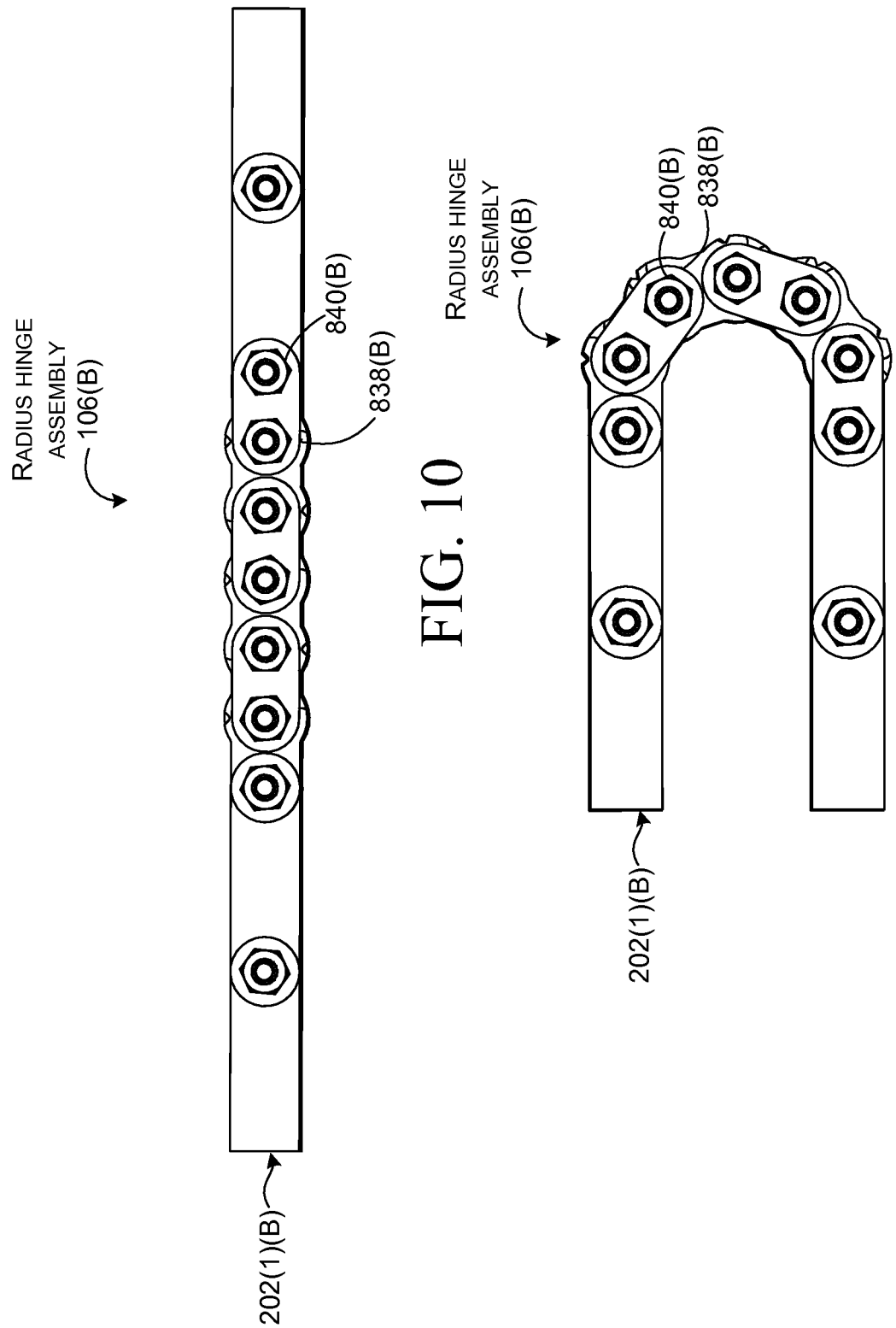

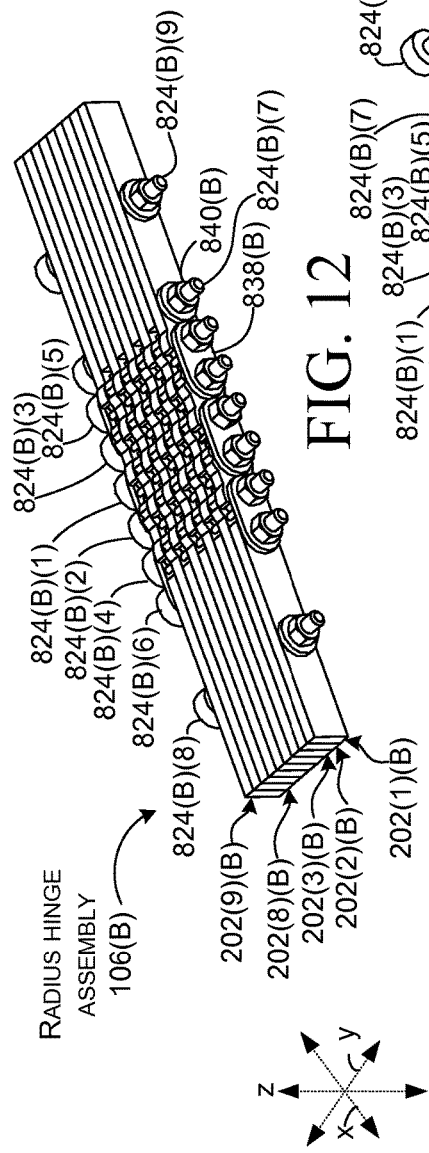
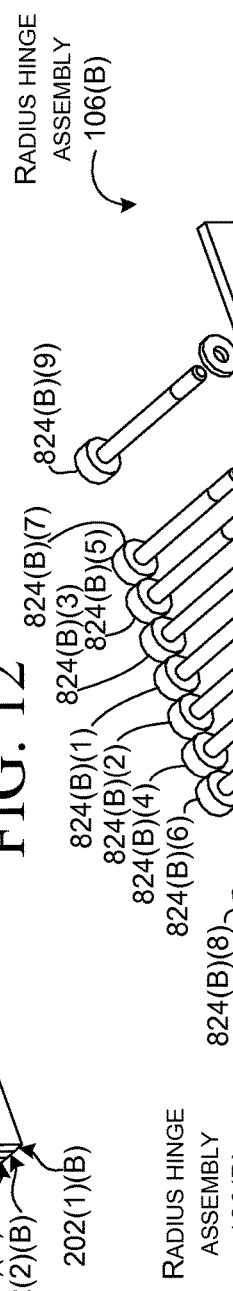
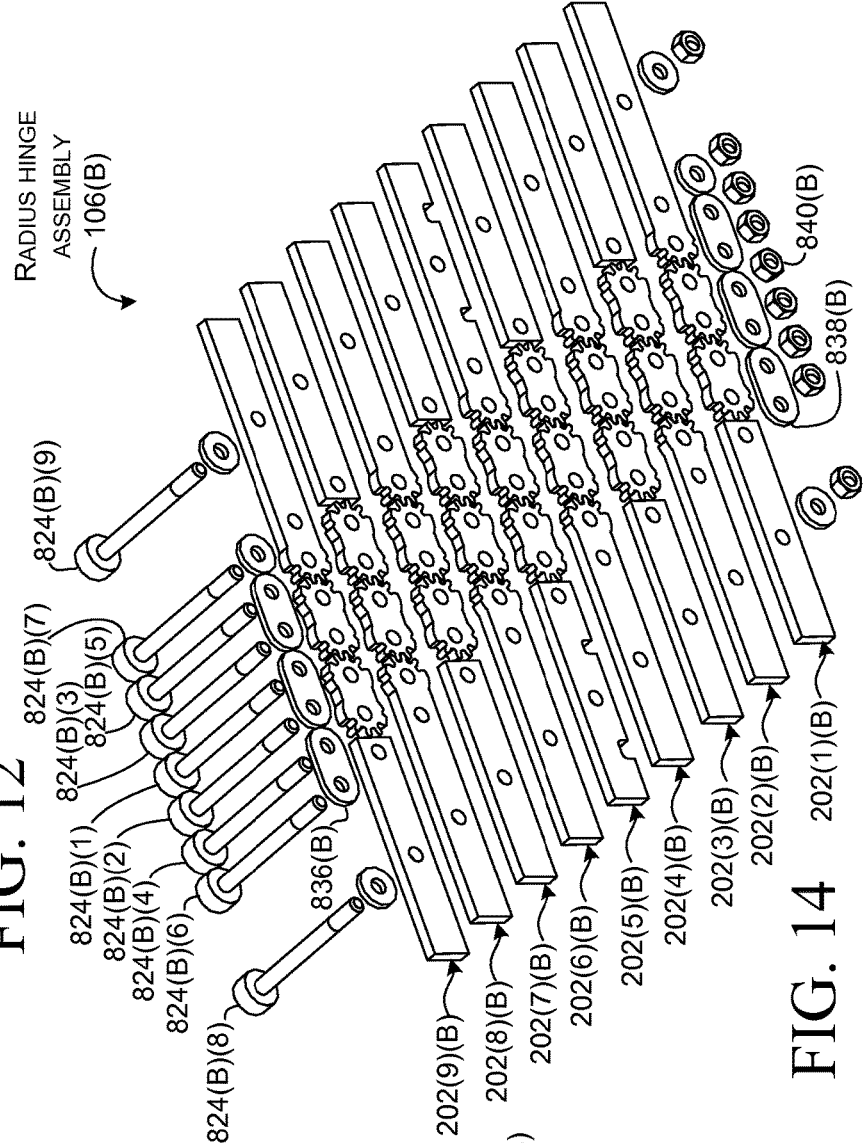
FIG. 12
FIG. 13
FIG. 14

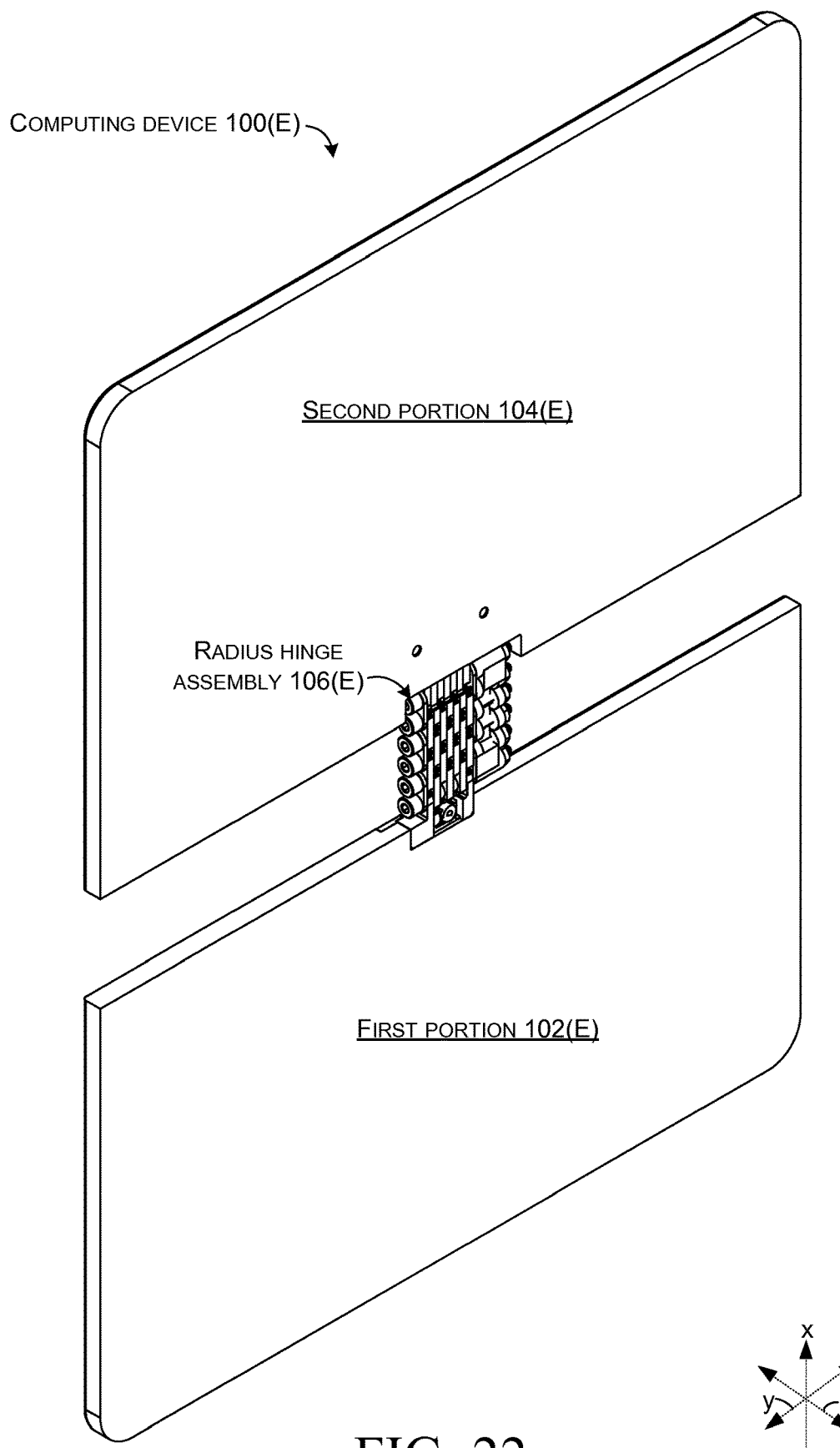
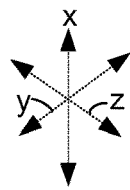
FIG. 22

FLEXIBLE DISPLAY COMPUTING DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIG. 1 is an example flexible display computing device that includes a radius hinge example in accordance with some implementations of the present concepts.

FIGS. 2-4 are elevational views of a radius hinge example in accordance with some implementations of the present concepts.

FIGS. 5-7 are perspective views of a radius hinge example in accordance with some implementations of the present concepts.

FIG. 8 is an exploded perspective view that is similar to the perspective view of FIG. 7.

FIG. 9 is an elevational view of a portion of the radius hinge example shown in FIGS. 1-8.

FIGS. 10-11 are perspective views of a radius hinge example in accordance with some implementations of the present concepts.

FIGS. 12-13 are perspective views of a radius hinge example in accordance with some implementations of the present concepts.

FIG. 14 is an exploded perspective view that is similar to the perspective view of FIG. 12.

FIGS. 19-22 shows perspective views of further example flexible display computing devices that includes a radius hinge example in accordance with some implementations of the present concepts.

DESCRIPTION

Figure 15:
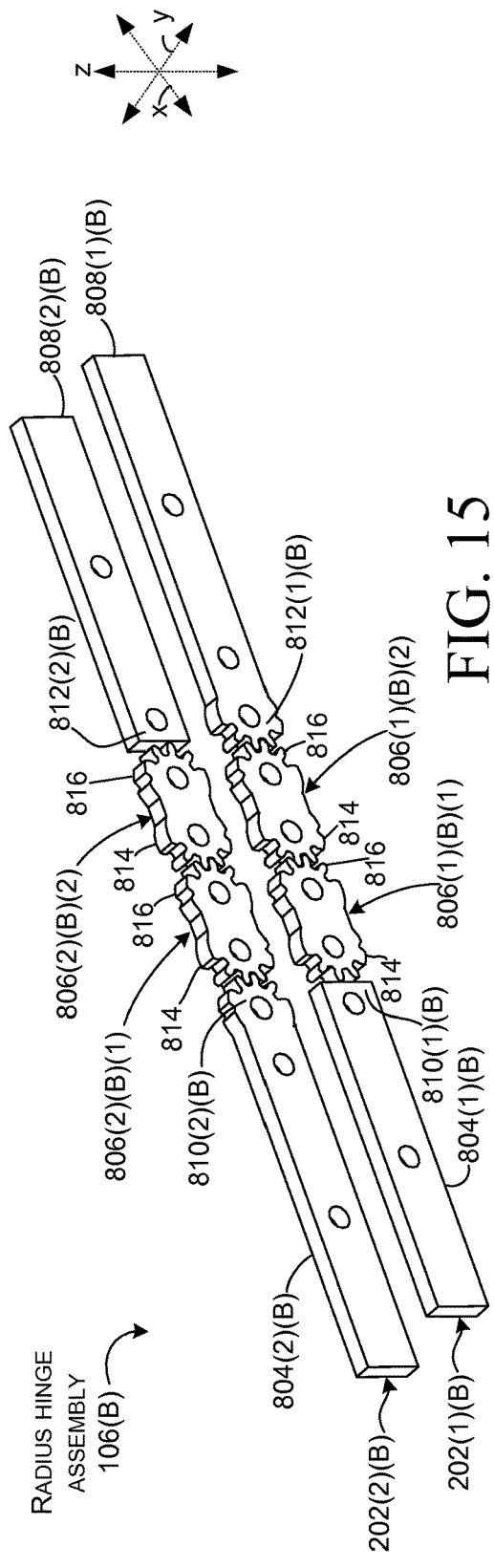
FIG. 15 is a perspective view of a portion of the radius hinge example shown in FIG. 14.

The present concepts relate to computing devices employing flexible displays. Flexible displays have advantages over rigid displays, but can be susceptible to damage. The present implementations can employ a hinge configuration to rotatably secure portions of the computing device while protecting the flexible display from damage.

Introductory FIG. 1 shows an example of a computing device 100 that has first and second portions 102 and 104 that are rotatably secured together by a radius hinge assembly 106 (in this case, two radius hinge assemblies 106(1) and 106(2)). A flexible display 108 is secured to the first and second portions 102 and 104.

The radius hinge assembly 106 can allow the computing device 100 to transition from the deployed configuration of instance one to the storage configuration of instance two. The deployed configuration can provide the user with a relatively large display area while the storage configuration can provide a smaller device footprint while protecting the flexible display 108 from damage. Note that a dimension in the x direction (e.g., dimension$_x$) is reduced by approximately half in the storage configuration relative to the deployed configuration. Further, the radius hinge assembly 106 can protect the flexible display 108 from damage in the storage configuration since the first and second portions can cover most or all of the flexible display 108 in the storage configuration.

Alternatively or additionally, while not readily apparent from FIG. 1, the radius hinge assembly 106 can protect the flexible display 108 from being pinched or crimped when the computing device 100 is in the storage position. The radius hinge assembly 106 can maintain a radius of curvature when the first and second portions 102 and 104 are moved relative to one another. The radius of curvature may reduce the concentration of forces that a traditional single axis hinge may impart to specific portions of the flexible display. Another way that the radius hinge assembly 106 can protect the flexible display is by having an adjustable length. The adjustable length can reduce imparting forces upon the flexible display as the computing device 100 is transitioned between states.

The computing device 100 is shown in a manner to emphasize the flexible display 108 and the radius hinge assembly 106. However, the computing device may include other components. For instance, in one case, the first and second portions can be manifest as housings. Electronic components, such as processors and/or storage, may be positioned on and/or in the housing and may be interconnected by conductors extending between the two portions. A myriad of computing device implementations is contemplated. For instance, the computing device can be manifest as an e-reader, a laptop computer, a tablet computer, a smart phone computer, a wearable smart device, a display device, a home appliance, a component of an airline seat, or a component of a vehicle, among other implementations.

In the discussion below, FIGS. 2-16 depict radius hinge assembly 106. FIGS. 17-27 depict the coupling of the radius hinge assembly to the computing device.

FIGS. 2-9 collectively show one implementation of radius hinge assembly 106 introduced above. This variation is distinguished via use of a suffix "A" (e.g., 106(A)). FIGS. 2-3 and 7-8 show the radius hinge assembly 106(A) in the 'open' or 'deployed' position (e.g., 180 degrees). FIGS. 4-6 show the radius hinge assembly 106(A) in a 'closed' or 'storage' position (e.g., zero degrees). FIGS. 10-16 show another radius hinge implementation which is designated 106(B).

As shown in FIG. 2, radius hinge assembly 106(A) may include at least first and second adjacent offset stacks 202. The illustrated configuration includes five stacks 202(1)-202(5), however, more or less stacks may be employed. The number of stacks may be increased to add additional resistance to the radius hinge assembly as may be desired for a particular application. As may be most readily appreciated in the exploded view of FIG. 8, individual stacks may include a first portion element (e.g., first element) 804, a timed link element 806, and a second portion element (e.g., second element) 808. To improve readability of the drawing page, only elements of the first two stacks 202(1) and 202(2) are designated. However, the stacks generally repeat themselves in an alternating manner. Thus, stack 202(3) and 202(5) are similar to stack 202(1) and stack 202(4) is similar to stack 202(2). Also, not every element is designated on every FIG. 2-9. In this implementation each stack includes a single timed link element 806. FIGS. 10-16 show another implementation where each stack includes multiple serially arranged timed link elements.

In the illustrated configuration of FIGS. 2-9, first portion element 804 can be secured to the first portion 102 (FIG. 1). Similarly, the second portion element 808 can be secured to the second portion 104 (FIG. 1). Relative to stacks 202(1), 202(3), and 202(5) a terminal end 810 of the first portion element 804(1) is not geared to engage the timed link element 806(1). In contrast, relative to stacks 202(2) and 202(4), the terminal ends 810 are geared to engage the timed link elements 806. Relative to stacks 202(1), 202(3), and 202(5) a terminal end 812 of the second portion element 808 is geared to engage the timed link elements 806. In contrast, relative to stacks 202(2) and 202(4), the terminal ends 812 are not geared to engage the timed link elements 806.

The timed link elements 806 can have generally opposing first and second ends 814 and 816 and a first hole 818 formed through the first end 814 and a second hole 820 formed through the second end 816. These elements are labeled without specificity in a callout 822 relative to FIG. 8 to avoid designator lines obscuring the main drawings. Note that in the illustrated configuration, individual timed link elements are geared on both ends. This configuration can allow radius hinge assemblies 106(A) to be constructed with fewer different types of elements. However, note that the first end 814 of timed link element 806(1) does not engage terminal end 810 of first portion element 804(1) and thus the gear teeth are not utilized and thus could be eliminated. Similarly, the second end 816 of timed link element 806(2) could also eliminate the gear teeth because it does not engage terminal end 812(2) of second portion element 808(2).

Radius hinge assembly 106(A) may include a generally elongate axis pin 824(1) that passes through the second hole 820 of the timed link element 806(1) of the first stack 202(1). The axis pin 824(1) can also pass through the first hole 818 of the timed link element 806(2) of the second stack 202(2) to secure the second stack 202(2) in an offset manner relative to the first stack 202(1). In this case, the offset manner can be defined by a pitch diameter of the timed link elements. FIG. 9 shows timed link element 806(1) and timed link element 806(2) at instance one. Timed link element 806(2) is shown in dashed lines since part of timed link element 806(2) is behind timed link element 806(1). Instance two shows the addition of pitch diameter 902 as defined by the second end 816 of the first timed link element 806(1) and a first end 814 of the second timed link element 806(2).

Returning to FIG. 8, the radius hinge assembly 106(A) may include a second axis pin 824(2) and a third axis pin 824(3) that are generally parallel to the first axis pin 824(1). The second axis pin 824(2) can pass through a hole 826 in the first element 804(2) of the second stack 202(2) and the hole 818 in the first end of the timed link element 806(1) of the first stack 202(1). The third axis pin 824(3) can pass through the hole 820 in the second end 816 of the timed link element 806(2) of the second stack 202(2) and a hole 828 in the second portion element 808(1) of the first stack 202(1).

In the present configuration, the second axis pin 824(2) and the third axis pin 824(3) are on opposite sides of the (first) axis pin 824(1). This configuration may include a fourth axis pin 824(4) that is adjacent to the second axis pin 824(2) and distal to the axis pin 824(1) and a fifth axis pin 824(5) that is adjacent to the third access pin 824(3) and distal to the axis pin 824(1). The fourth axis pin 824(4) can pass through a second hole 830 in the first element 804(2) of the second stack 202(2) and a hole 831 in the first element 804(1) of the first stack 202(1). The fifth axis pin 824(5) can pass through a hole 832 in the second portion element 808(2) of the second stack 202(2) and a second hole 834 of the second portion element 808(1) of the first stack 202(1).

In this implementation, the axis pins 824 can be manifest as threaded bolts. The bolts can pass through link covers 836 (not all of which are designated with specificity) through the stacks 202(1)-202(5) and through another set of link covers 838 and a set of threaded nuts 840. In the present configuration, the second axis pin 824(2) and the fourth axis pin 824(4) share common link covers on each side of the first and fifth stacks and the axis pin 824(1) and the third axis pin 824(3) share other common link covers on each side of the first and fifth stacks. The threaded bolts, link covers, and the nuts 840 may provide a compressive force to squeeze the stacks against one another to create friction between the adjacent elements. In some implementations, an axial load may be applied between elements through the use of a spring washer between the nuts 840 and the link covers 838 to create and maintain the desired friction interface between the stacks. The spring washer can help to maintain the axial load even as elements wear. At some point, if the spring washer cannot maintain the load, these implementations can be readily adjusted by tightening the bolt/nuts to increase the friction.

The illustrated configuration may be viewed as employing axial friction to control hinge stiffness. Other types of axial friction configurations are contemplated. An alternative configuration can utilize oversize axis pins 824 (relative to the holes). The oversize axis pins can be force fitted through the holes in the stacks 202 to create a friction fit between the axis pin and the elements defining the holes. This configuration may be viewed as employing radial friction to control hinge stiffness and other configurations are contemplated.

In this implementation, relative to the first stack 202(1), the first end 814 of the timed link element 806(1) does not engage the first portion element 804(1). The second end 816 of the timed link element 806(1) can engage the second portion element 808(1) in a no-slip one-to-one rotational engagement. Relative to the second stack 202(2), the first end 814 of the timed link element 806(2) can engage the first portion element 804(2) in a no-slip one-to-one rotational engagement and the second end 816 of the timed link element 806(2) does not engage the second portion element 808(2). In this case, the no-slip one-to-one rotational engagement is accomplished by intermeshing gears that cause the radius hinge assembly to rotate around axis pins 824(1), 824(2), and 824(3) simultaneously. Other implementations can utilize other gear profiles and/or types of gears and/or can utilize non-geared solutions such as smooth but high friction radial surfaces.

Characterized from one perspective, the radius hinge implementation illustrated in FIGS. 2-9 can simultaneously pivot around three axes (e.g., axis pins 824(1), 824(2), and 824(3)). The discussion that follows describes a radius hinge implementation that can simultaneously pivot around five axes (and other numbers of pivot axes are contemplated). Given equivalent size elements, increasing the number of axes can increase the hinge radius. Another way of increasing the hinge radius can involve increasing the pitch diameter while keeping the number of axes constant.

FIGS. 10-16 show another radius hinge assembly 106(B) that is similar to radius hinge assembly 106(A) described above relative to FIGS. 2-9. As such, not all elements are re-introduced here for sake of brevity. The suffix "(B)" is utilized to distinguish elements of radius hinge assembly 106(B) from the implementations described above. In this case, FIG. 14 is an exploded perspective view that is similar to FIG. 8 and which lends itself to visualization of the elements. This implementation includes nine stacks 202(1)(B)-202(9)(B). Other numbers of stacks are contemplated. Further, the stacks are secured by axis pins 824(B)(1)-824(B)(9), link covers 836(B) and 838(B), and nuts 840(B). This implementation employs more axis pins, link covers, and nuts than the implementation described above relative to FIGS. 2-9. The functionality, however, remains similar. As such, these elements are not discussed in detail relative to FIGS. 10-16. Due to the amount of elements in this implementation and the constraints of the drawing page, example stacks 202(1)(B) and 202(2)(B) are shown in isolation relative to FIG. 15 so that more room is available on the drawing page for labeling specific elements.

As can be appreciated from FIG. 15, the timed link element 806 of an individual stack 202 comprises first and second timed link elements 806. For instance, stack 202(1)(B) includes first timed link element 806(1)(B)(1) and 806(1)(B)(2) and stack 202(2)(B) includes first timed link element 806(2)(B)(1) and 806(2)(B)(2). Relative to the first stack 202(1)(B), the first end 814 of the first timed link element 806(1)(B)(1) does not engage the terminal end 810(1)(B) of first portion element 804(1)(B). The second end 816 of the first timed link element 806(1)(B)(1) can engage a first end 814 of the second timed link element 806(1)(B)(2). A second end 816 of the second timed link element 806(1)(B)(2) can engage the terminal end 812(1)(B) of the second portion element 808(1)(B). Relative to the second stack 202(B)(2), the first end 814 of the first timed link element 806(2)(B)(1) can engage the terminal end 810(2)(B) of first portion element 804(2)(B) in a no-slip one-to-one rotational engagement. The second end 816 of the first timed link element 806(2)(B)(1) can engage a first end 814 of the second timed link element 806(2)(B)(2) in a no-slip one-to-one rotational engagement and a second end 816 of the second timed link element 806(2)(B)(2) does not engage the terminal end 812(2)(B) of the second portion element 808(2)(B). Each of these engagements can provide a no-slip one-to-one rotational engagement such that the radius hinge assembly functions as a single unit that rotates around multiple axes simultaneously. For instance, in the example illustrated in FIG. 14, the multiple axes of rotation are defined by axis pins 824(B)(1)-824(B)(5), whereas in the implementation of FIG. 8, the multiple axes of rotation are defined by axis pins 824(1)-824(3).

Figure 16:
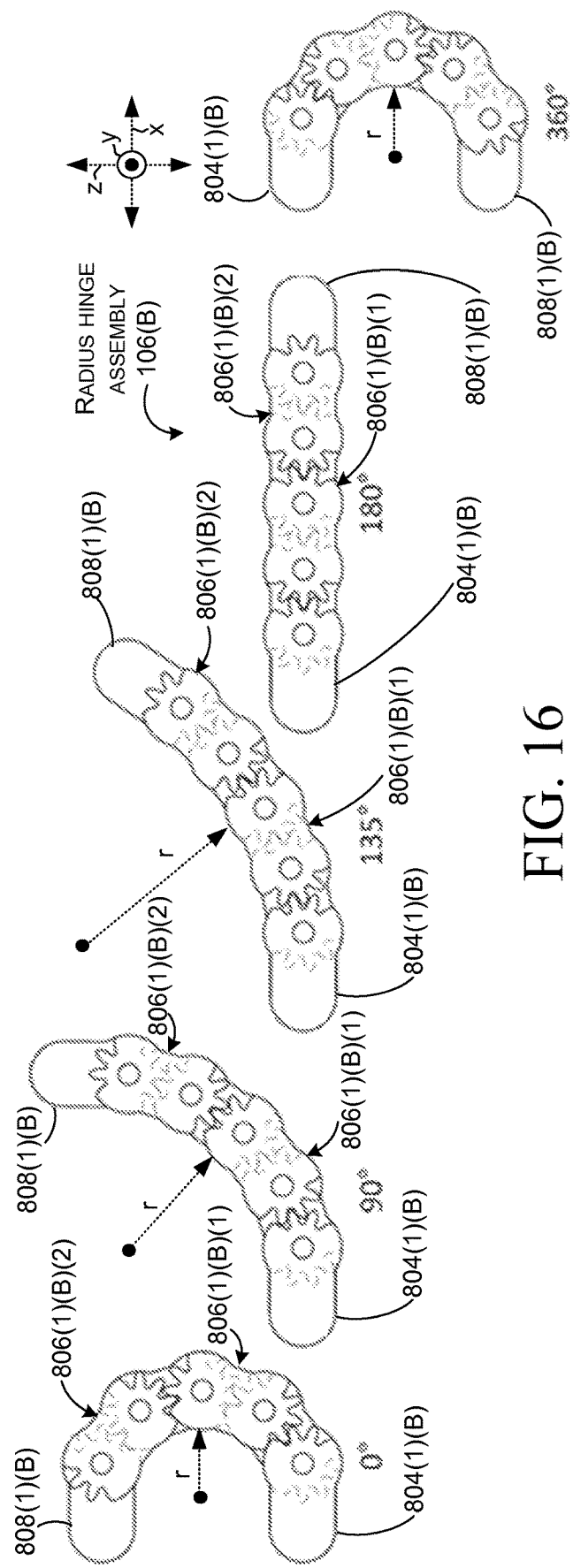
FIG. 16 is an elevational view of a portion of the radius hinge example shown in FIGS. 10-15.

FIG. 16 shows the second portion element 808(1)(B), timed link elements 806(1)(B)(1) and 806(1)(B)(2), and first portion element 804(1)(B) of radius hinge assembly 106(B). FIG. 16 shows how the radius hinge assembly 106(B) can simultaneously rotate around multiple axes (represented by the holes which are shown but not designated to avoid clutter on the drawing page, but which are designated relative to FIG. 8 and which are configured to receive the axis pins). FIG. 16 shows the radius hinge assembly 106(B) at zero degrees, 90 degrees, 135 degrees, 180 degrees and 360 degrees. Note that while some implementations can allow full 360 degree rotation (or even a few degrees more), other implementations can limit rotation at lesser values, such as 180 degrees. One point that is common to either scenario is that the radius hinge assembly can achieve this rotation while maintaining a minimum bend radius r. In this case, the bend radius is at its lowest value at 0 degrees and 360 degrees with higher values for the intervening values. Note that while the radius hinge assembly can be capable of full 360 degree rotation, mechanical stops can be included that limit the rotation at a specific value such as 135 degrees or 180 degrees, for example. Given equivalent size elements, the minimum bend radius can be enlarged by adding more timed link elements 806. For example, compare FIG. 4 which employs a single timed link element per stack to FIG. 11 which employs two link elements per stack.

The radius hinge assembly can be thought of as a friction hinge with timed gearing to control curvature of the hinge through a full range of articulation. The gearing can couple the individual timed link elements together to spread friction requirements over all of the friction elements. The elements can provide triple duty as gears, linkages, and friction elements. The radius hinge assembly can also be thought of as a progressive hinge that entails less force to move at zero (e.g., low angle) and more force as the number of degrees increases.

Figure 17:
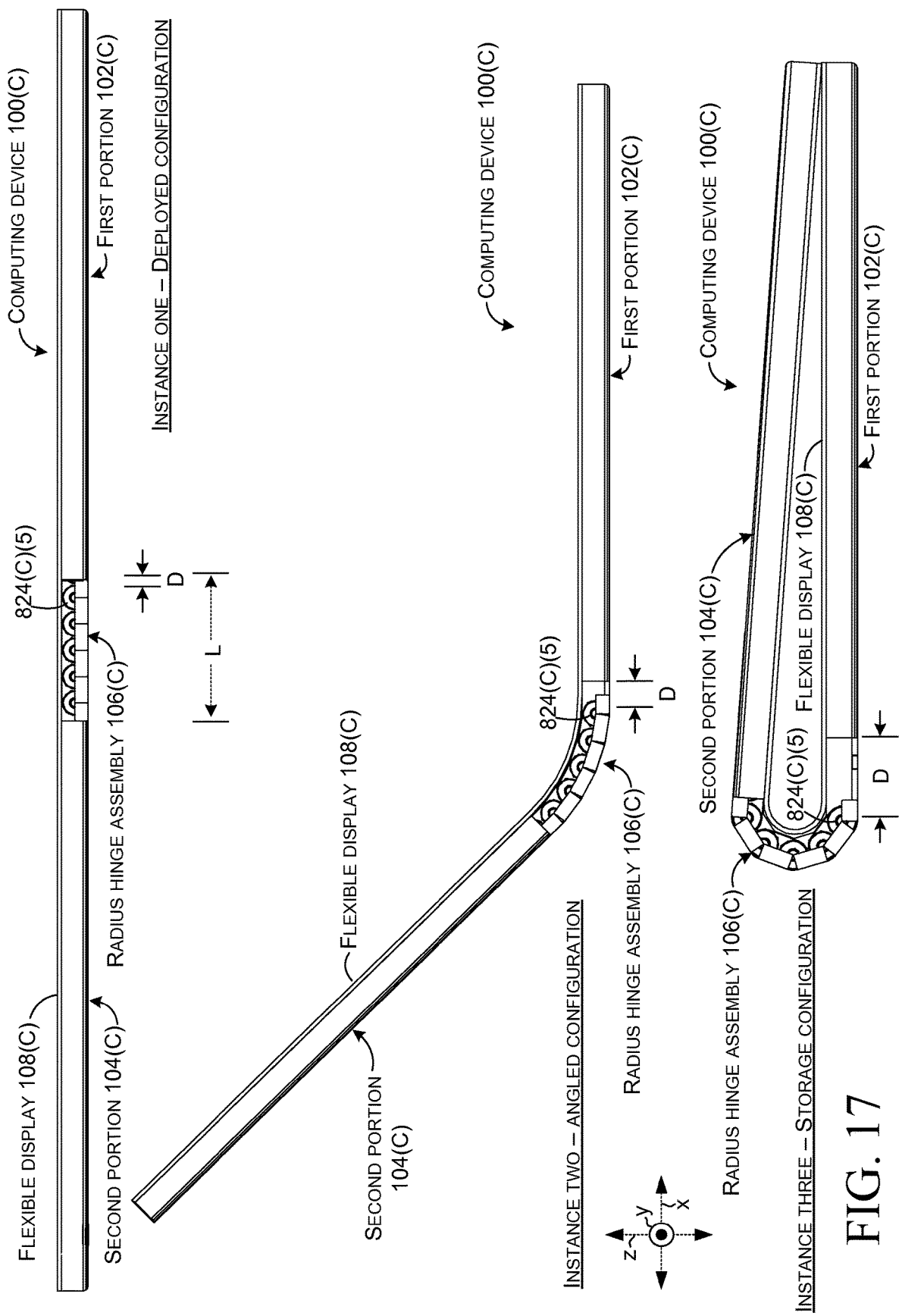
FIG. 17 is an elevational view of another example flexible display computing device that includes a radius hinge example in accordance with some implementations of the present concepts.

FIG. 17 shows elevational views of computing device 100(C) that is similar to computing device 100 of FIG. 1. Computing device 100(C) can include first and second portions 102(C) and 104(C) as well as radius hinge assembly 106(C) and flexible display 108(C). In some implementations the radius hinge assembly 106(C) can be secured to the first and second portions 102(C) and 104(C) in a manner that allows an overall length L of the radius hinge assembly to increase as the computing device transitions from the deployed configuration of instance one to the angled position of instance two and finally the storage position of instance three. Due to constraints of the drawing page length L is only specifically labeled on instance one and FIG. 18). Note for comparison sake that in instance one axis bolt 824(C)(5) is proximate to the first portion 102(C) as evidenced by dimension D. Dimension D can contribute to the change in length L. Allowing dimension D to change can reduce and/or eliminate stress forces that might otherwise be imparted on the flexible display from transitioning the computing device to various positions. This aspect is described below relative to FIG. 18.

Figure 18:
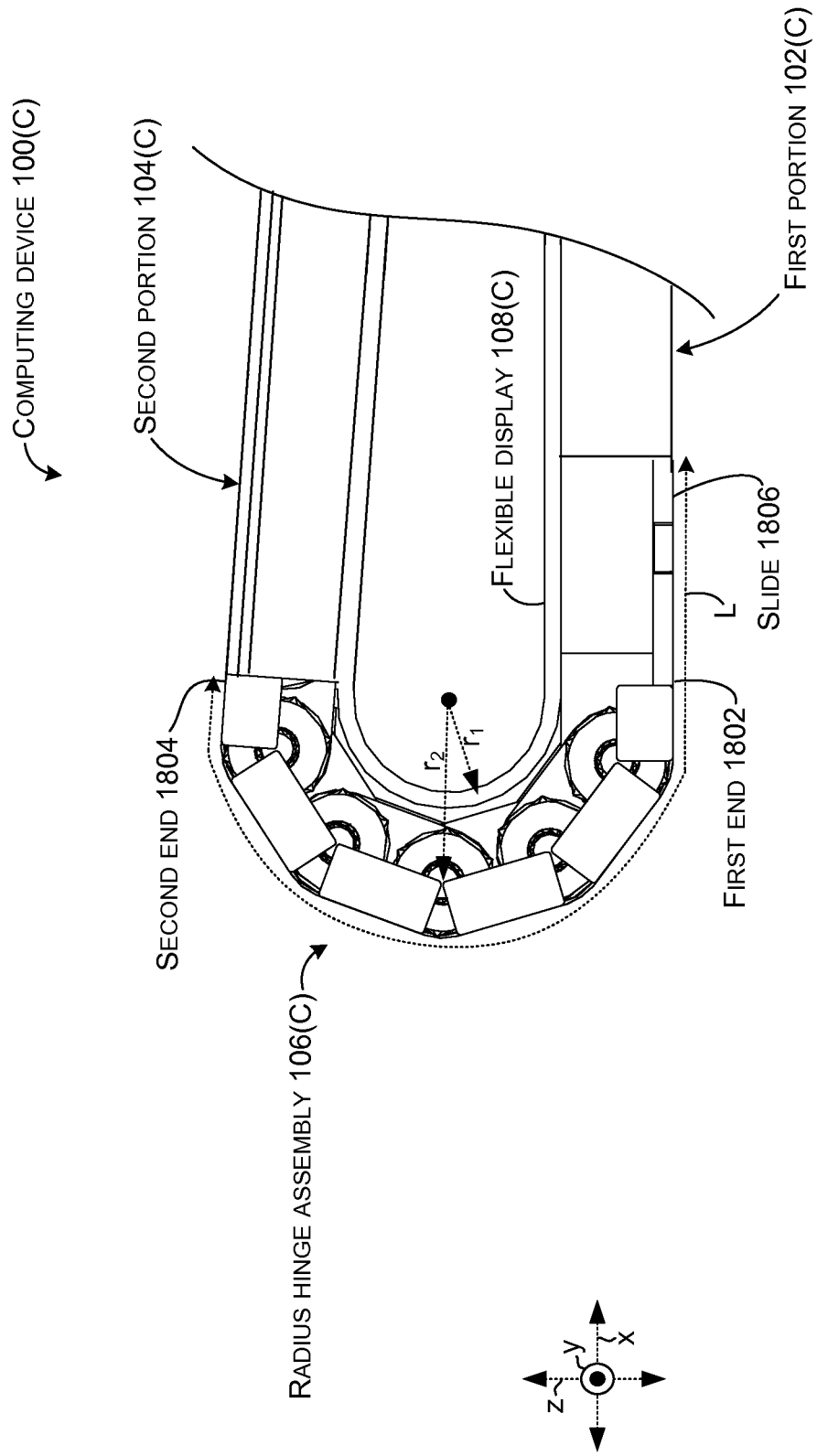
FIG. 18 is an enlarged elevational view of a portion of the example flexible display computing device of FIG. 17.

FIG. 18 shows an enlarged portion of the computing device 100(C) from instance three of FIG. 17. In this case, a first end 1802 of the radius hinge assembly 106(C) is movably secured to first portion 102(C) while a second end 1804 is fixedly secured to second portion 104(C). In this configuration, the radius hinge assembly 106(C) can include a slide 1806 that is attached to the first end 1802 and the first portion 102(C) and can allow movement in the x reference direction between the first end 1802 and the first portion 102(C).

Considered from one perspective, transitioning the computing device 100(C) to different configurations could impart stress upon the flexible display 108(C). For instance, the flexible display 108(C) can be characterized as transitioning around a bend radius $r_1$ and the radius hinge assembly 106(C) can be characterized as transitioning around a bend radius $r_2$ that is different than $r_1$. This difference could cause stress forces to be imparted on the flexible display 108(C) and/or the radius hinge assembly 106(C). Such forces could lead to component fatigue and failure. For instance, the flexible display 108(C) could be creased or crimped or otherwise rendered inoperable. The present concepts can address this issue via slide 1806 or other elements that allow lateral movement of one or both ends of the radius hinge assembly 106(C) according to the configuration of the computing device 100(C). The slide may reduce and/or eliminate these stress forces and thereby protect the components. While not illustrated, other implementations can alternatively or additionally allow movement of the flexible display 108(C). In some configurations, the $r_1$ (e.g., the flexible display) can be the neutral axis and lengthening of the radius hinge assembly can reduce stresses that would otherwise be imparted by a static hinge assembly.

In summary, FIGS. 17-18 show a radius hinge implementation where the radius hinge can grow when the hinge is packaged behind the flexible display. In some implementations, the flexible display can define the neutral axis as the display could not expand or contract. The radius hinge can be offset from the neutral axis but can accommodate the growth as changes to dimension D. Recall that by allowing one side of the hinge to slide within one of the device portions the radius hinge can change length as the display angle is changed.

In some implementations the flexible display can be secured to both sides of the device portions (e.g. both first and second portions 102(C) and 104(C)) to create a fixed relationship between the two portions of the computing device. The friction aspect of the radius hinge assembly 106(C) may provide angular stability while the slide 1806 may provide hinge growth and stability in the lateral (y) direction because one of the degrees of freedom would be constrained because of the slide.

Multiple slide configurations are contemplated. Two of these slide configurations are uncontrolled slides and controlled slides. Examples of uncontrolled slides are described below relative to FIG. 19. Examples of controlled slides are described below relative to FIGS. 20-27.

Figure 19:
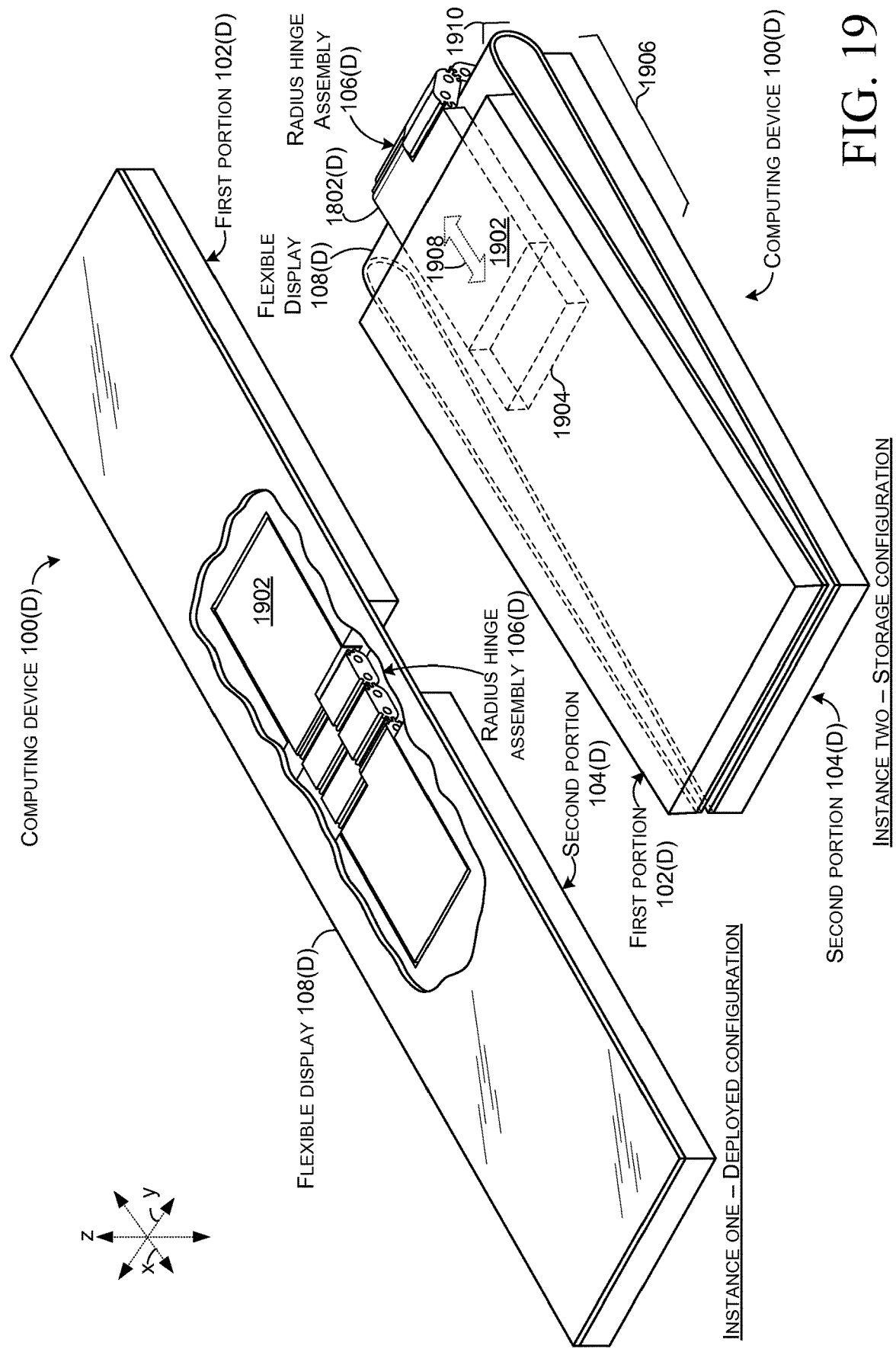

FIG. 19 shows computing device 100(D) in a deployed configuration at instance one and a storage configuration at instance two. In instance one, flexible display 108(D) is shown partially cut away to expose the underlying radius hinge assembly 106(D) that couples the first and second portions 102(D) and 104(D). In this case, the portions are generally rigid material, such as metal or polymer. Other implementations could use a less rigid material, such as a resilient polymer material. In this implementation, the portions include generally planar surfaces (these planar surfaces are inwardly facing in the storage configuration of instance two and thus can be termed 'inside surfaces'). In this case the flexible display covers essentially all of these surfaces and but such need not be the case.

Instance two uses ghost (e.g., dashed) lines to show underlying elements of the computing device 100(D). In this case, first end 1802(D) of the radius hinge assembly 106(D) includes a box-shaped protuberance 1902. The box-shaped protuberance rides in a slot 1904 formed in the first portion 102(D) to form a slide 1906. The slide 1906 can allow movement along the x reference axis as indicated by arrow 1908 as the computing device is transitioned between configurations. This movement of the radius hinge assembly can decrease and/or eliminate stress forces on the flexible display 108(D), especially as the first and second portions are folded into the storage configuration of instance two. This implementation can be thought of as an uncontrolled slide in that the forces on the radius hinge assembly 106(D) and the flexible display 108(D) cause movement of the protuberance 1902 within the slot 1904. Note also that this movement can allow the flexible display 108(D) to maintain a radius curvature or bend 1910 as discussed above relative to FIG. 18.

FIGS. 20-25 collectively show another computing device 100(E) that includes a radius hinge assembly 106(E) and a flexible display 108(E). In this case, the flexible display is shown only in FIG. 23 so that the radius hinge assembly 106(E) can be better visualized in FIGS. 20-22 and 24-25. Subsequent FIGS. 26-27 collectively show still another flexible display computing device 100(F) that includes a radius hinge assembly 106(F).

Figure 20:
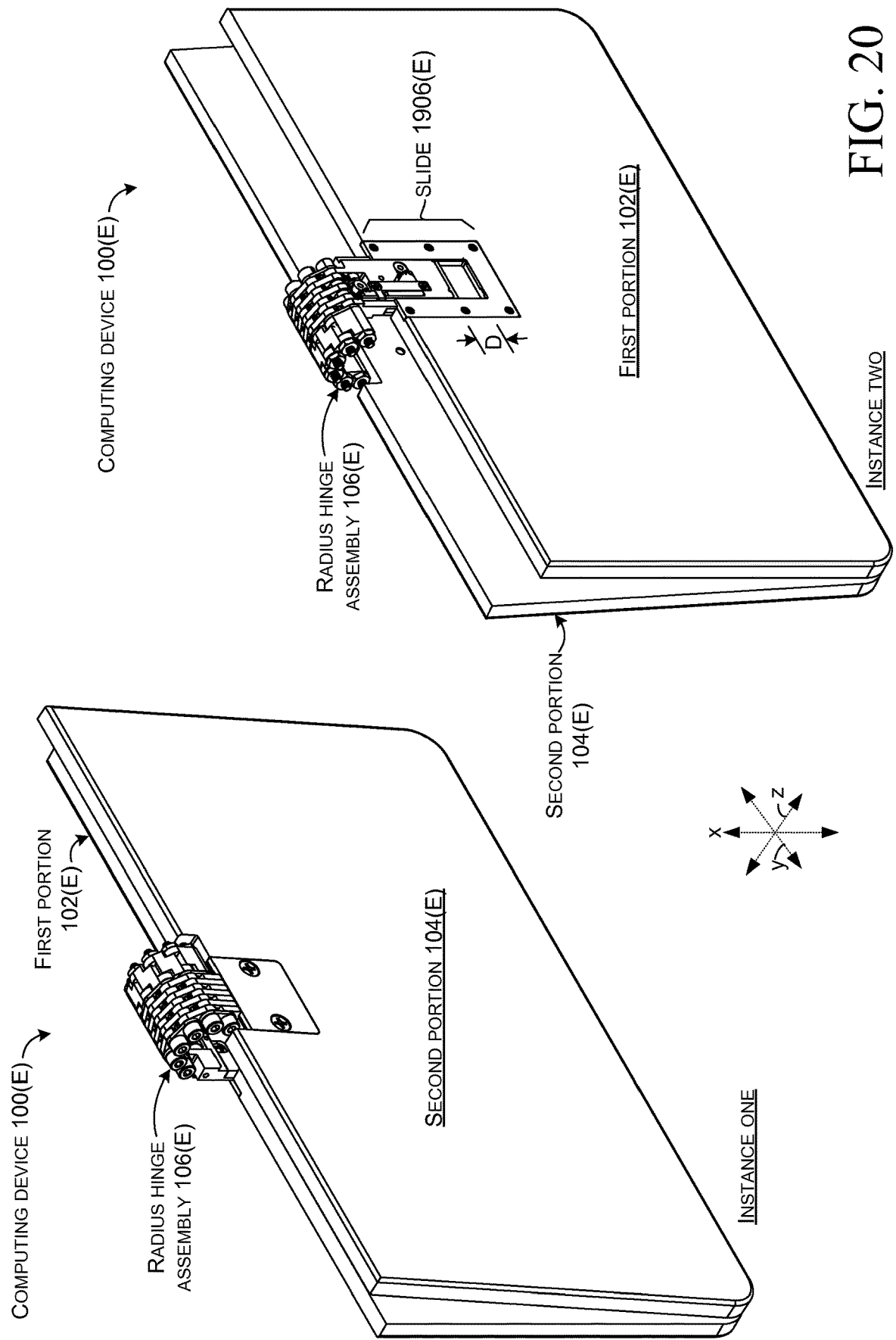

FIG. 20 shows the storage configuration of computing device 100(E). Instance one shows the second portion 104(E) facing the reader. Instance two shows the first portion 102(E) facing the reader so that slide 1906(E) is visible to the reader. In this case, dimension D relating to slide movement and introduced above relative to FIG. 17 has a value greater than zero. This can be contrasted with FIG. 21 where dimension D has changed to zero.

Figure 21:
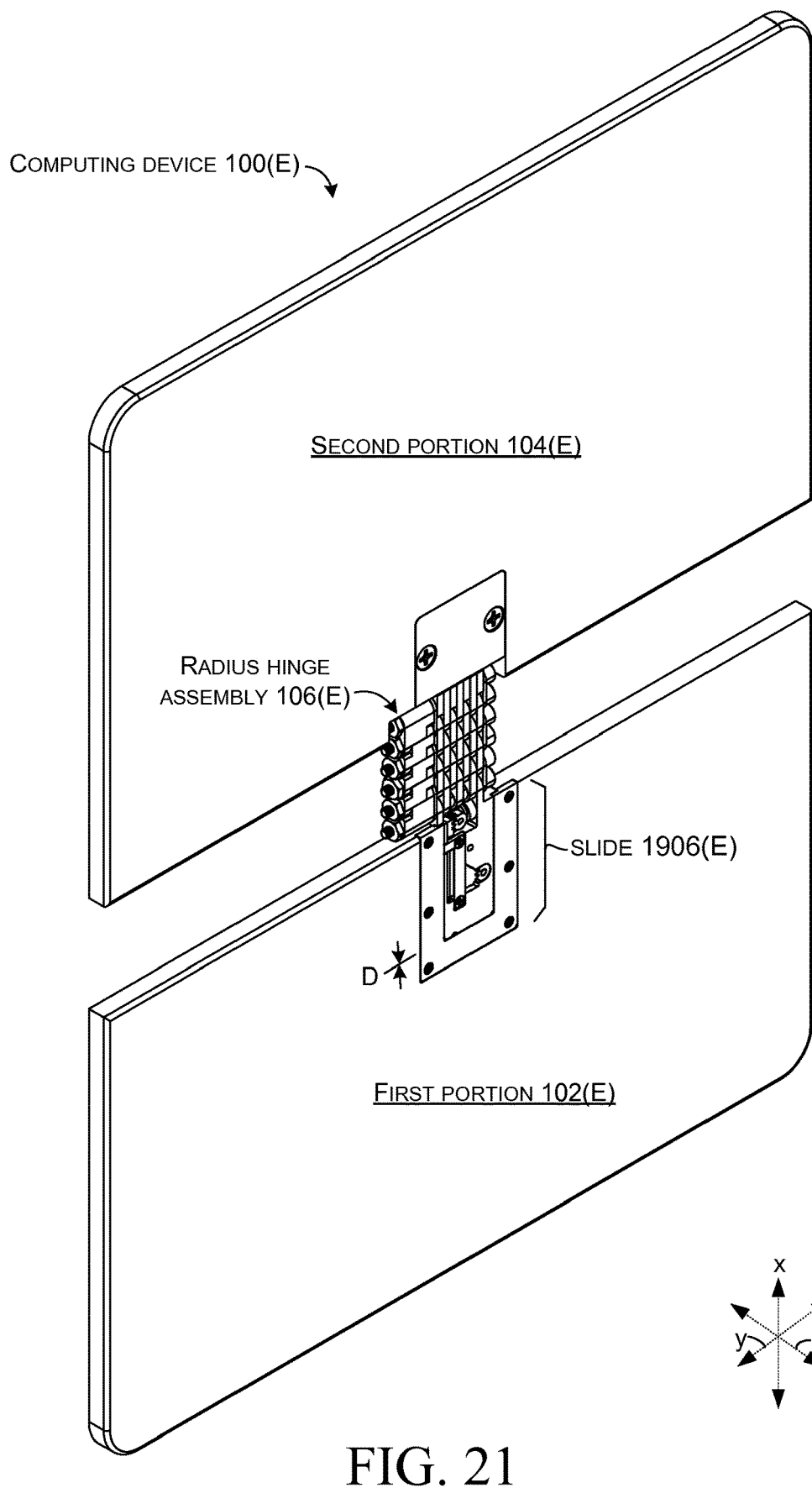

FIG. 21 shows computing device 100(E) in the deployed configuration. FIG. 22 shows computing device 100(E) in the deployed configuration from the opposite side as FIG. 21.

Figure 23:
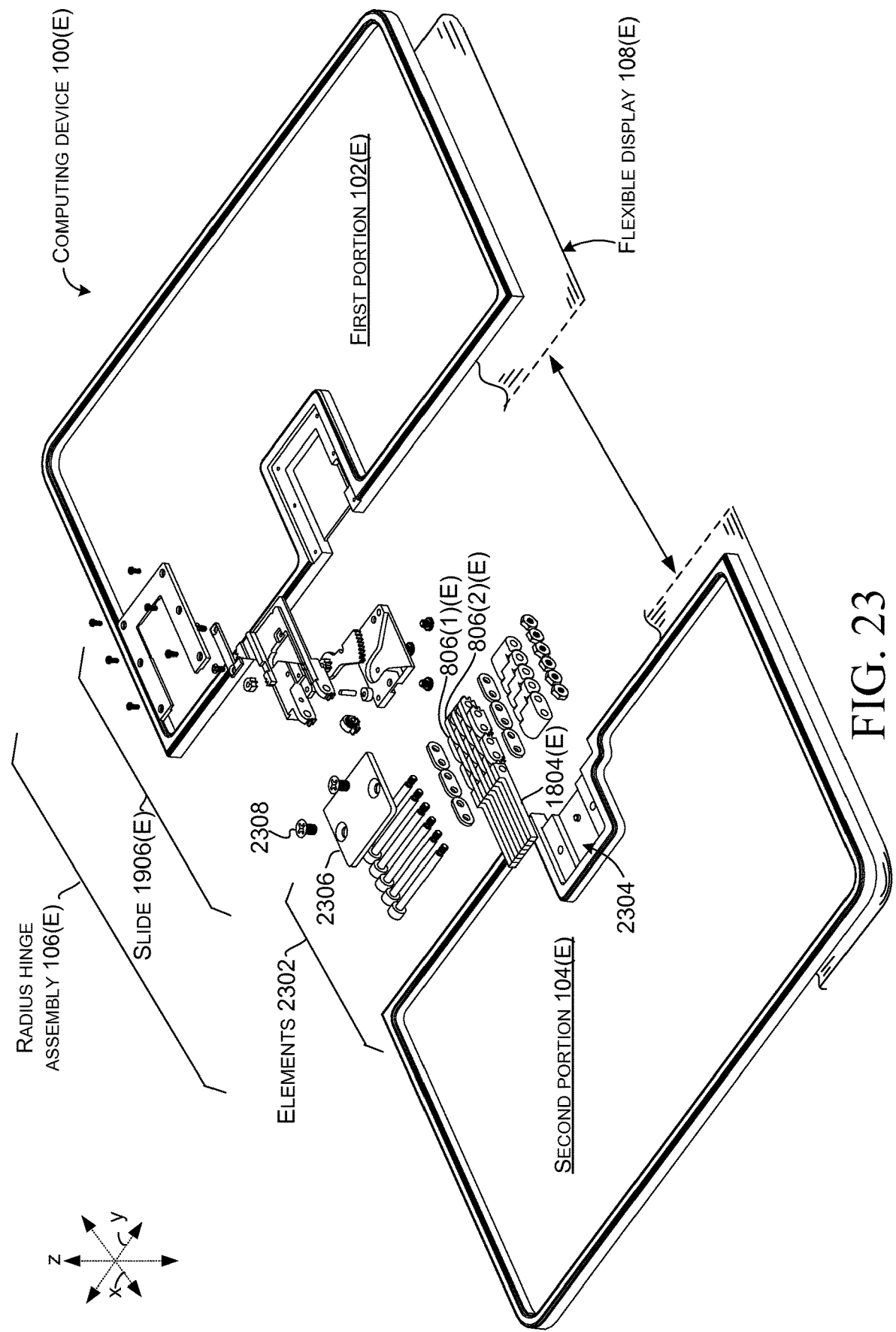
FIG. 23 is an exploded perspective view of the example flexible display computing device of FIGS. 20-22.
Figure 24:
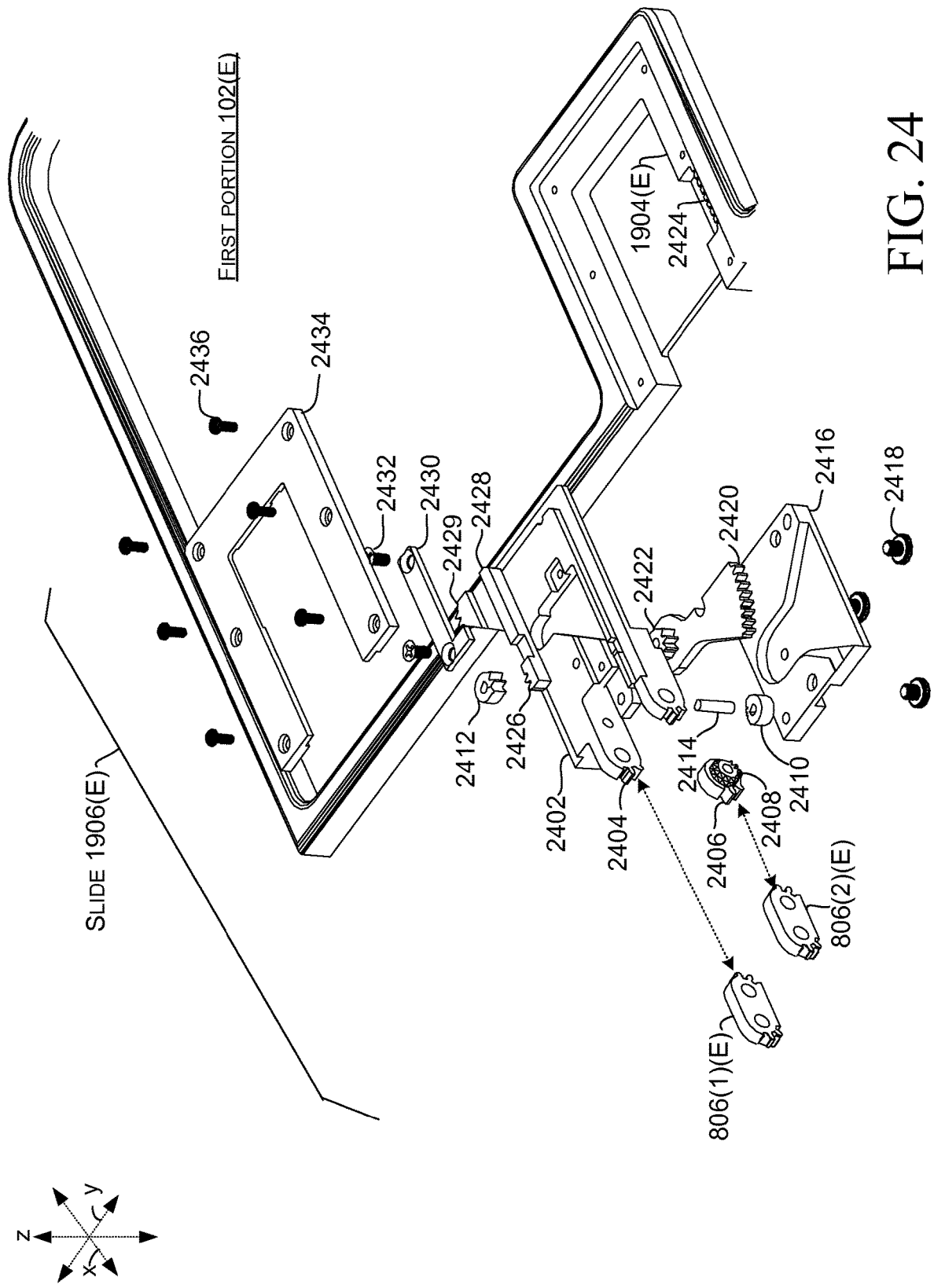
FIG. 24 is an enlarged portion of the exploded view of FIG. 23.
Figure 25:
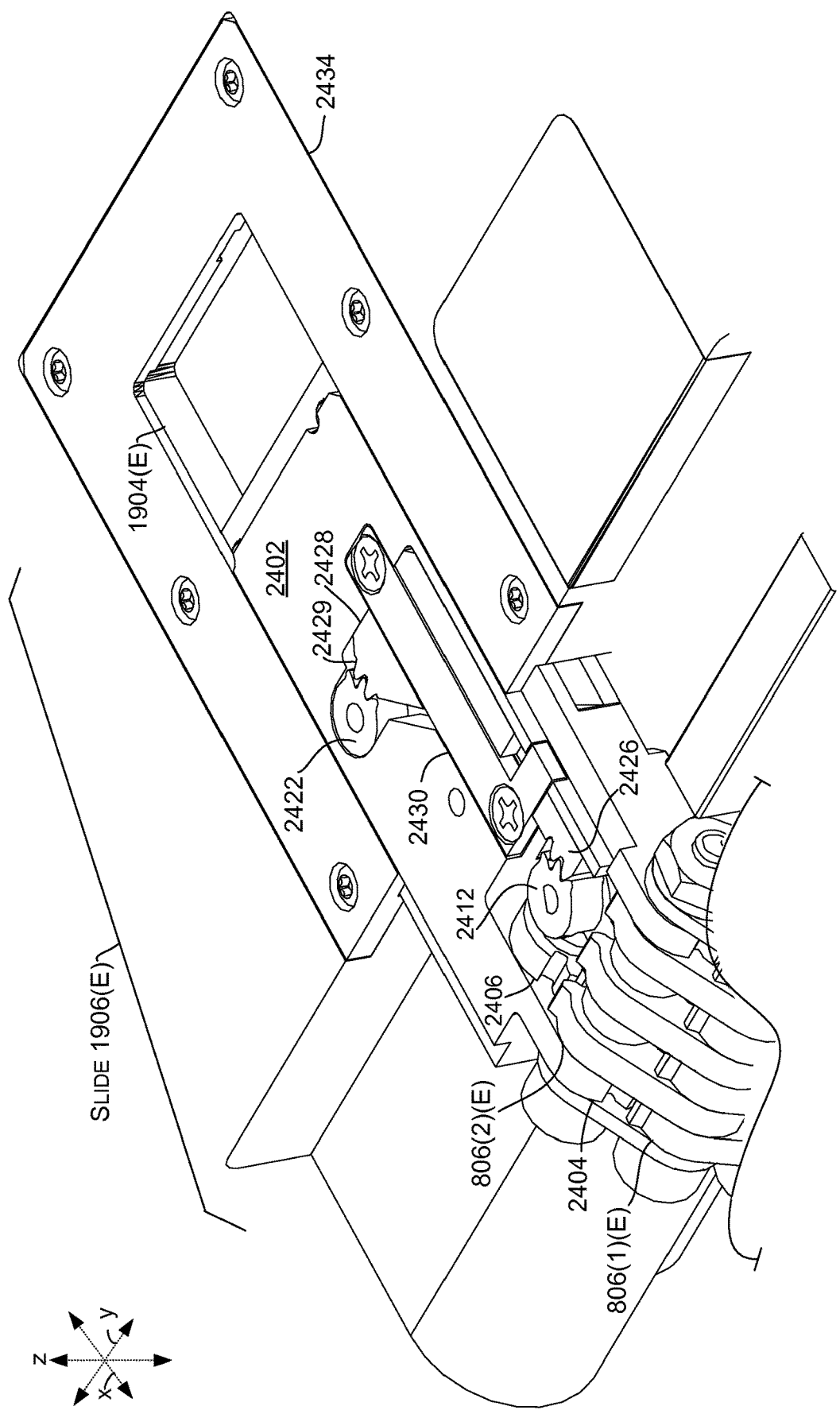
FIG. 25 is a perspective view of a similar portion of the example flexible display computing device shown in FIG. 24.

FIG. 23 shows an exploded view of computing device 100(E). FIG. 24 shows an enlarged portion of the view of FIG. 23 relating to the slide 1906(E). FIG. 25 shows an assembled view of the slide 1906(E). Briefly, in FIG. 23 grouped elements 2302 are similar to those described relative to FIG. 14 and are not discussed here in detail for sake of brevity. In this case, second end 1804(E) of the radius hinge assembly 106(E) can be fixedly secured to the second portion 104(E) via a recess 2304, a plate 2306, and fasteners 2308, among other configurations. Note that two timed link elements 806(1)(E) and 806(2)(E) are designated in FIG. 23 and discussed relative to FIGS. 24-25. For further discussion of the timed link elements refer to the discussion of FIGS. 14-15.

As illustrated in FIGS. 24-25, slide 1906(E) may include a slide carrier 2402. The slide carrier 2402 can terminate in spur gear terminus 2404. A spur gear 2406 can be joined with a miter gear 2408. A miter gear 2410 can be connected to a spur gear 2412 via a 'D' pin 2414. A member 2416 can be secured to slide carrier 2402 via fasteners 2418. The member 2416 can hold connected spur gears 2420 and 2422 relative to the slide carrier 2402. Spur gear 2420 can interact with rack 2424 formed along a slot 1904(E) in first portion 102(E). A rack 2426 can be formed on a rack carrier 2428 that includes another rack 2429. A rack cover 2430 can be secured to the slide carrier 2402 via fasteners 2432. A housing cover 2434 can be secured by fasteners 2436 to the first portion 102(E) relative to slot 1904(E) to further define surfaces upon which slide carrier 2402 can move.

As can be appreciated from FIGS. 24-25, in this implementation, movement of the offset gears of the radius hinge assembly 106(E) is linked to, and causes movement of, the slide carrier 2402. As such, the timed nature of the radius hinge assembly drives timed movement of the slide carrier 2402 in the slot 1904(E). More specifically, movement of the timed link element 806(1)(E) is timed by spur gear terminus 2404. Further, timed movement of timed link element 806(2)(E), such as when a user transitions the computing device 100(E) between configurations, can drive spur gear 2406 and miter gear 2408. The miter gear 2408 can engage miter gear 2410 and drive spur gear 2412 via 'D' pin 2414. Spur gear 2412 can drive spur rack 2426 of rack carrier 2428. The rack carrier's other rack 2429 can move and drive gear 2422 which then drives gear 2420 to interact with rack 2424 to move the slide carrier 2402 of the slide 1906(E). Thus, viewed from one perspective, the timed gears of the radius hinge assembly 106(E) can drive the movement of the slide in a controlled manner. As such, this implementation may be viewed as a controlled slide. While a slide is employed here, other implementations can use other mechanisms for changing the length of the hinge assembly when transitioning the first and second portions between configurations, such as the deployed configuration to the storage configuration.

Figure 26:
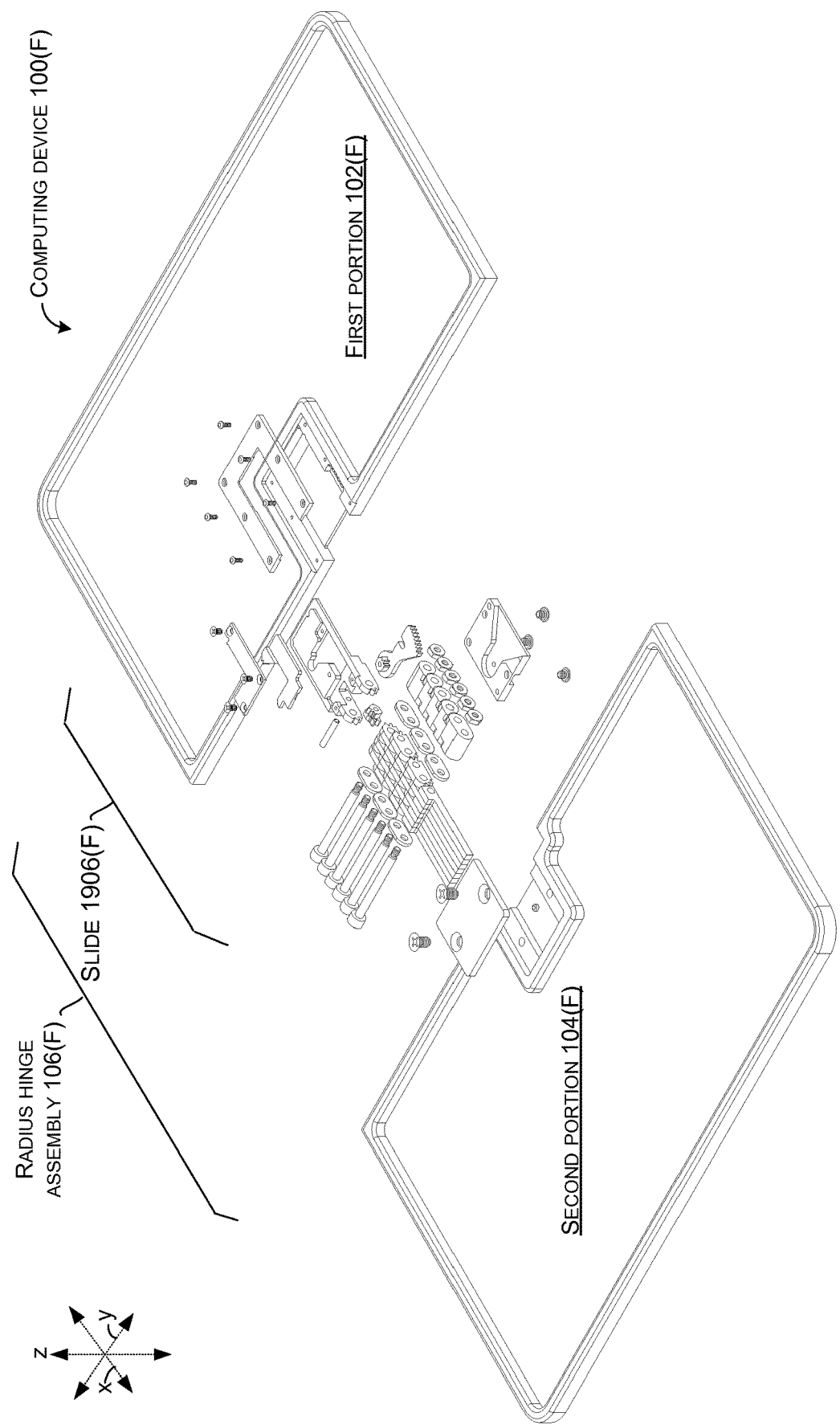
FIG. 26 is an exploded perspective view, which is similar to FIG. 23, of another example flexible display computing device implementation.
Figure 27:
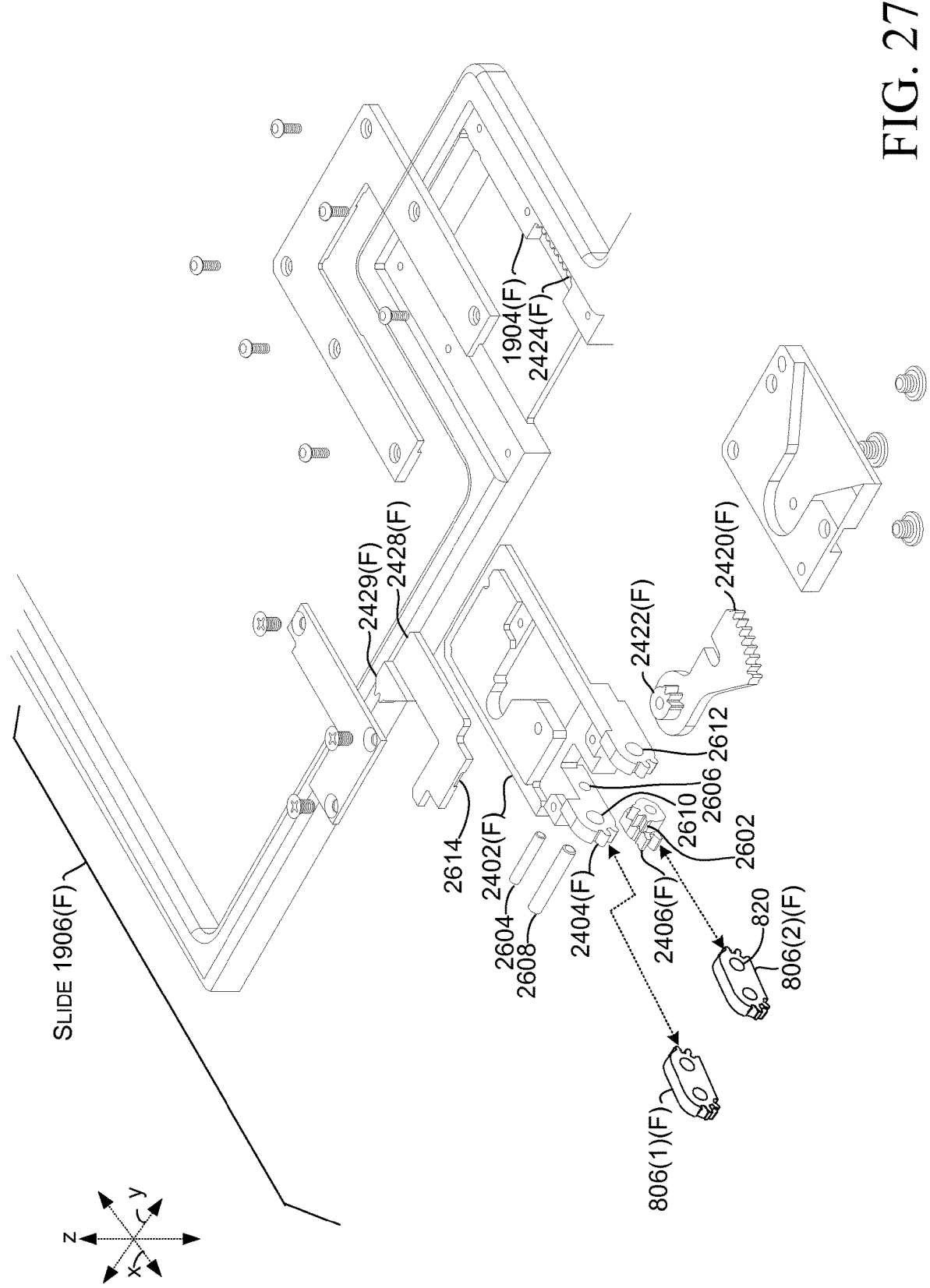
FIG. 27 is an enlarged portion of the exploded view of FIG. 26.

FIGS. 26-27 collectively show still another flexible display computing device 100(F) that includes a radius hinge assembly 106(F) that couples first portion 102(F) to second portion 104(F). The radius hinge assembly can include slide 1906(F). As will be explained below, slide 1906(F) is another example of a controlled slide. FIG. 26 is a similar view to FIG. 23 and FIG. 27 is a similar view to FIG. 24. The flexible display is not shown in these FIGS. but is visualized in FIG. 23 relative to computing device 100(E).

Radius hinge assembly 106(F) shares multiple components with radius hinge assembly 106(E) of FIGS. 20-25 and these components are not reintroduced here for the sake of brevity unless the differences are germane to the explanation of the functioning of the radius hinge assembly. As illustrated in FIG. 27, slide 1906(F) can include slide carrier 2402(F). The slide carrier 2402(F) can terminate in spur gear terminus 2404(F). Spur gear 2406(F) can be joined with another spur gear 2602. A pin 2604 can pass horizontally through hole 2606 in slide carrier 2402(F), through spur gear 2406(F) and another spur gear 2602, and into another hole (not visible) in the slide carrier 2402(F) to retain the spur gears in the slide carrier. Timed link element 806(2)(F) can engage spur gear 2406(F). Another pin 2608 can pass through hole 2610 in terminus 2404(F), through hole 820 in timed link element 806(2)(F), and finally hole 2612 in a corresponding terminus of the slide carrier 2402(F) to secure the timed link element 806(2)(F) (and hence the radius hinge) to the slide carrier 2402(F). Rack carrier 2428(F) can include a rack gear 2614 (on the underside of the rack such that only the end of the rack gear is visible in FIG. 27).

The first and second portions 102(F) and 104(F) (FIG. 26) can be moved relative to one another by a user. Such movement can cause timed link element 806(2)(F) to drive spur gear 2406(F), which can drive spur gear 2602. Spur gear 2602 can drive rack gear 2614 to move rack carrier 2428(F). Moving the rack carrier 2428(F) moves rack 2429(F) which turns spur gear 2422(F) which is fixably attached to spur gear 2420(F). Driving spur gear 2420(F) against rack 2424(F) slides the slide carrier relative to slot 1904(F) in a controlled manner. In this case, the controlled manner is dictated by the timed interaction of the various gears.

Individual elements of the radius hinge assembly can be made from various materials, such as sheet metals, die cast metals, machined parts, and/or molded plastics, among others, or any combination of these materials. Stacks can be added to create higher friction for larger loads.

Any type of flexible display material(s) can be utilized. Flexible display technologies are rapidly developing and the present concepts can be applied to any of these technologies, such as but not limited to flexible electronic paper based displays, flexible organic light-emitting diode (OLED)-based displays, among others.

In summary, the above discussion relates to devices, such as computing devices that have hinged portions and flexible displays. One example can include a first portion and a second portion and a flexible display secured to the first and second portions. This example can also include a hinge assembly rotatably securing the first and second portions. The hinge assembly can be fixedly secured to the second portion and movably secured to the first portion such that a length of the hinge assembly can change when the first portion and second portion are rotated relative to one another.

Another example can include a flexible display secured to a first portion of the computing device and a second portion of the computing device. The example can also include a radius hinge assembly rotatably securing the first and second portions of the computing device. The radius hinge assembly can be configured to maintain a minimum bend radius of the flexible display when the first and second portions are rotated relative to one another.

A further example can include a radius hinge assembly rotatably securing first and second rigid portions to allow transition from a deployed configuration to a storage configuration. This example can also include a flexible display secured to an inside surface of the first rigid portion and an inside surface of the second rigid portion. The radius hinge assembly can be configured to protect the flexible display from being crimped when the inside surfaces are brought together in the storage configuration.

FURTHER EXAMPLES

A computing device including a first portion and a second portion as well as a flexible display secured to the first and second portions. The computing device also including a hinge assembly rotatably securing the first and second portions. The hinge assembly being fixedly secured to the second portion and movably secured to the first portion such that a length of the hinge assembly changes when the first portion and second portion are rotated relative to one another.

The computing device of the above and/or below examples, wherein the first portion includes a housing containing electronic components, and wherein the second portion includes another housing containing other electronic components.

The computing device of any combination of the above and/or below examples, wherein the hinge assembly includes a radius hinge assembly.

The computing device of any combination of the above and/or below examples, wherein the hinge assembly is configured to allow 0 to 180 degrees of rotation of the first and second portions relative to one another.

The computing device of any combination of the above and/or below examples, wherein the hinge assembly provides progressively increased resistance as an angle between the first portion and the second portion increases.

The computing device of any combination of the above and/or below examples, wherein the hinge assembly includes a protuberance that is configured to move in a slot formed in the first portion.

The computing device of any combination of the above and/or below examples, wherein movement of the protuberance in the slot is controlled by the hinge assembly.

The computing device of any combination of the above and/or below examples, wherein movement of the protuberance in the slot is not controlled by the hinge assembly.

The computing device of any combination of the above and/or below examples, wherein the hinge assembly includes a slide and a first element of the slide is secured to the hinge assembly and a second element of the slide is secured to the first portion.

The computing device of any combination of the above and/or below examples, wherein the first element includes a slide carrier and movement of the slide carrier is timed to movement of the first and second portions relative to one another.

The computing device of any combination of the above and/or below examples, wherein the hinge assembly includes a radius hinge assembly that includes timed link elements and wherein the timed link elements drive the movement of the slide carrier.

The computing device of any combination of the above and/or below examples, wherein the hinge assembly maintains a minimum bend radius to protect the flexible display.

The computing device of any combination of the above and/or below examples, wherein the computing device is manifest as an e-reader, a laptop computer, a tablet computer, a smart phone computer, a home appliance, a component of an airline seat, or a component of a vehicle.

A computing device including a flexible display secured to a first portion of the computing device and a second portion of the computing device and a radius hinge assembly rotatably securing the first and second portions of the computing device and configured to maintain a minimum bend radius of the flexible display when the first and second portions are rotated relative to one another.

The computing device of any combination of the above and/or below examples wherein the flexible display covers an entire planar surface of the first portion and another planar surface of the second portion.

The computing device of any combination of the above and/or below examples wherein the flexible display functions as a neutral axis when the first and second portions are rotated relative to one another.

The computing device of any combination of the above and/or below examples wherein a dimension of the radius hinge assembly can change when the first and second portions are rotated relative to one another to decrease stress forces experienced by the flexible display.

A computing device example including a radius hinge assembly rotatably securing first and second rigid portions to allow transition from a deployed configuration to a storage configuration. The computing device example also including a flexible display secured to an inside surface of the first rigid portion and an inside surface of the second rigid portion, and wherein the radius hinge assembly is configured to protect the flexible display from being crimped when the inside surfaces are brought together in the storage configuration.

The computing device of any combination of the above and/or below examples, wherein the radius hinge assembly is fixedly secured to the second rigid portion and movably secured to the first rigid portion.

The computing device of any combination of the above and/or below examples, wherein the deployed configuration orients the first rigid portion at about 180 degrees from the second rigid portion, and wherein the storage configuration orients the first rigid portion at about 0 degrees from the second rigid portion with the flexible display being positioned therebetween.

EXAMPLE METHODS

Various methods of manufacture, assembly, and use for computing devices, hinge assemblies, and/or flexible displays are contemplated beyond those shown above relative to FIGS. 1-27.

CONCLUSION

Although techniques, methods, devices, systems, etc., pertaining to computing devices that employ flexible displays are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a first portion and a second portion;
a hinge assembly comprising:
a fixed end fixedly secured to the second portion, and
a sliding end comprising a protuberance, the sliding end slidably secured relative to the first portion, where the protuberance moves in a slot formed in the first portion such that a length of the hinge assembly changes when the hinge assembly is used to rotate inside surfaces of the first portion and the second portion toward one another for a storage configuration and away from one another for a deployed configuration, the protuberance including a rack carrier that is retained in the slot to secure the sliding end to the first portion; and,
a flexible display secured to the inside surfaces of the first and second portions such that the flexible display is folded inside the computing device and the hinge assembly wraps around an outside of the folded flexible display in the storage configuration.

2. The computing device of claim 1, wherein the first portion comprises a housing containing electronic components, and wherein the second portion comprises another housing containing other electronic components.

3. The computing device of claim 1, wherein the hinge assembly comprises a radius hinge assembly.

4. The computing device of claim 1, wherein the hinge assembly is configured to allow 0 to 180 degrees of rotation of the first and second portions relative to one another.

5. The computing device of claim 1, wherein the hinge assembly provides progressively increased resistance as an angle between the first portion and the second portion increases.

6. The computing device of claim 1, wherein the hinge assembly is slidably secured relative to the first portion via a slot formed in the first portion and a minimum bend radius of the hinge assembly.

7. The computing device of claim 1, wherein movement of the protuberance in the slot is controlled by the hinge assembly.

8. The computing device of claim 1, wherein movement of the protuberance in the slot is not controlled by the hinge assembly.

9. The computing device of claim 1, wherein, in the deployed configuration, the inside surfaces of the first and second portions and the hinge assembly comprise a planar surface and outside surfaces of the first and second portions and the hinge assembly comprise another planar surface.

10. The computing device of claim 1, wherein:
movement of the protuberance in the slot is timed to movement of timed link elements of the hinge assembly as the first and second portions move relative to one another.

11. The computing device of claim 10, wherein the hinge assembly comprises a radius hinge assembly and wherein the timed link elements comprise gears that provide simultaneous rotation of the timed link elements and that simultaneously drive the movement of the rack carrier of the protuberance in the slot.

12. The computing device of claim 1, wherein the hinge assembly maintains a minimum bend radius to protect the flexible display.

13. The computing device of claim 1, wherein the computing device is manifest as an e-reader, a laptop computer, a tablet computer, a smart phone computer, a home appliance, a component of an airline seat, or a component of a vehicle.

14. A computing device, comprising:
a flexible display secured to a first portion of the computing device and a second portion of the computing device; and,
a radius hinge assembly comprising timed link elements and a slide, the radius hinge assembly slidably secured to the first portion via the slide and fixedly secured to the second portion, the radius hinge assembly maintaining a minimum bend radius of the flexible display when the first and second portions are rotated toward one another via the radius hinge assembly into a storage configuration where the minimum bend radius of the flexible display is positioned inside a curve of the radius hinge assembly and the flexible display is protected within the computing device, the timed link elements controlling movement of the slide relative to the first portion.

15. The computing device of claim 14, wherein the timed link elements comprise gear teeth that drive the movement of the slide relative to the first portion.

16. The computing device of claim 14, wherein the flexible display functions as a neutral axis when the first and second portions are rotated relative to one another.

17. The computing device of claim 16, wherein a dimension of the radius hinge assembly can change via the slide when the first and second portions are rotated relative to one another to decrease stress forces experienced by the flexible display.

18. A computing device, comprising:
a radius hinge assembly comprising a slide carrier, a first end of the radius hinge assembly slidably securing a first rigid portion via the slide carrier and a second end of the radius hinge assembly fixedly securing a second rigid portion, the slide carrier comprising gear teeth that interact with other gear teeth of the first rigid portion to allow sliding of the slide carrier and transition of the computing device from a deployed configuration to a storage configuration; and,
a flexible display secured to an inside surface of the first rigid portion and an inside surface of the second rigid portion, and wherein the radius hinge assembly protects the flexible display from being crimped inside the computing device via sliding of the slide carrier when the inside surfaces are brought together in the storage configuration.

19. The computing device of claim 18, wherein in the deployed configuration, the computing device has a planar outer surface formed by outer surfaces of the first rigid portion and the second rigid portion and an outer surface of the radius hinge assembly.

20. The computing device of claim 18, wherein the deployed configuration orients the first rigid portion at about 180 degrees from the second rigid portion, and wherein the storage configuration orients the first rigid portion at about 0 degrees from the second rigid portion with the flexible display being positioned therebetween.

* * * * *